United States Patent
Matsumoto

[11] Patent Number: 5,881,266
[45] Date of Patent: Mar. 9, 1999

[54] PRIORITY-BASED MEMORY MANAGEMENT METHOD AND APPARATUS

[75] Inventor: Toshio Matsumoto, Kanagawa, Japan

[73] Assignee: Mitsubishi Denki Kabushiki Kaisha, Tokyo, Japan

[21] Appl. No.: 351,712

[22] Filed: Dec. 8, 1994

[30] Foreign Application Priority Data

Mar. 10, 1994  [JP]  Japan .................................. 6-039905
Sep. 7, 1994   [JP]  Japan .................................. 6-213842

[51] Int. Cl.⁶ ...................................................... G06F 12/12
[52] U.S. Cl. ............................................ 395/461; 395/486
[58] Field of Search ..................................... 395/463, 461, 395/460, 471, 459, 486, 487, 440

[56] References Cited

U.S. PATENT DOCUMENTS

| | | | |
|---|---|---|---|
| 5,253,351 | 10/1993 | Yamamoto et al. | 395/445 |
| 5,257,352 | 10/1993 | Yamamoto et al. | 395/463 |
| 5,305,389 | 4/1994  | Palmer | 382/305 |
| 5,452,440 | 9/1995  | Salsburg | 395/463 |
| 5,515,519 | 5/1996  | Yoshioka et al. | 395/581 |

FOREIGN PATENT DOCUMENTS 62-106557  5/1987  Japan .
63-4356    1/1988  Japan .

OTHER PUBLICATIONS

Hennessy et al., "Computer Architecture A Quantitative Approach", 1990, pp. 411–412.

Primary Examiner—Eddie P. Chan
Assistant Examiner—Kevin L. Ellis
Attorney, Agent, or Firm—Wolf, Greenfield & Sack P.C

[57] ABSTRACT

The hit ratio of a cache memory in a data base processing system is improved by changing the priority of erasing cache data. A forward/backward pointer and a backward/forward pointer are contained as cache management information. At a completion of access of all the data of a table and before the next access of a table begins, the forward/backward pointer is changed to the backward/forward pointer and the backward/forward pointer is changed to the forward/backward pointer if the hit ratio is lower than expected ratio. Depending on the type of data access or external commands, the priority of erasing cache data is further changed to achieve a high hit ratio.

36 Claims, 24 Drawing Sheets

FIG.5

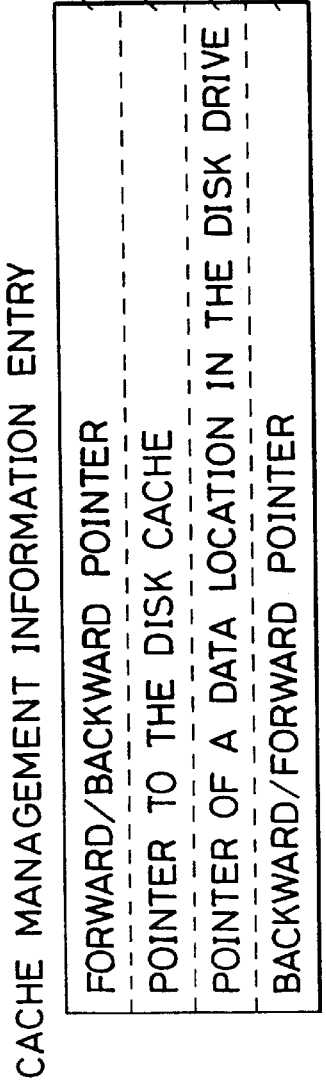

CACHE MANAGEMENT INFORMATION ENTRY

| FORWARD/BACKWARD POINTER | 4 |
| POINTER TO THE DISK CACHE | 5 |
| POINTER OF A DATA LOCATION IN THE DISK DRIVE | 6 |
| BACKWARD/FORWARD POINTER | 7 |

FORWARD POINTER······TO CHAIN ACCORDING TO THE ORDER OF THE RECENT ACCESS
BACKWARD POINTER······TO CHAIN ACCORDING TO THE ORDER OF THE OLDEST ACCESS
POINTER TO THE DISK CACHE 2······POINTER TO THE DISK CACHE 2 WHICH THIS ENTRY MANAGES
POINTER OF A DATA LOCATION IN THE DISK DRIVE······POINTER WHICH INDICATES THE LOCATION OF THE DATA STORED IN THE DISK DRIVE

FIG. 8
(c)
ACCESS OF DATA D1
(BACKWARD POINTER IN THE UPPER SECTION/ FORWARD POINTER IN THE LOWER SECTION)
(d)
ACCESS OF DATA D2
(BACKWARD POINTER IN THE UPPER SECTION/ FORWARD POINTER IN THE LOWER SECTION)
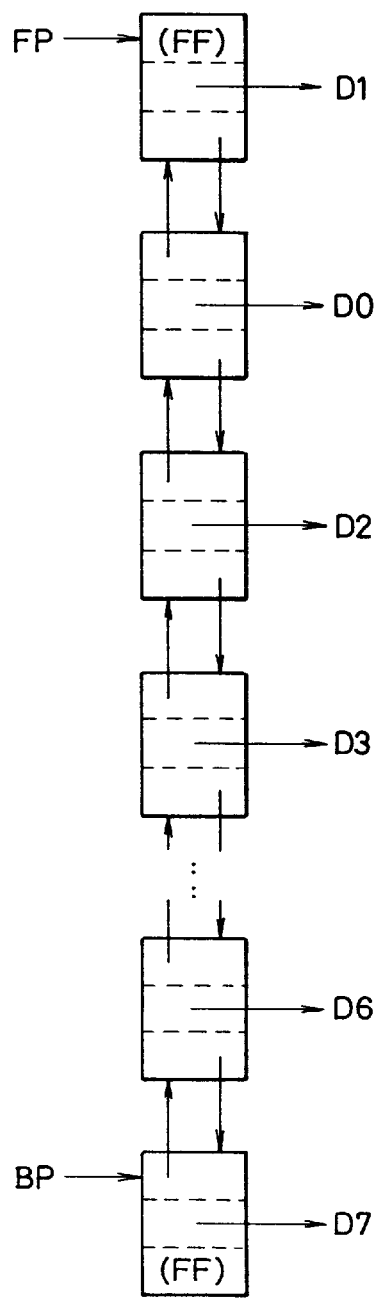
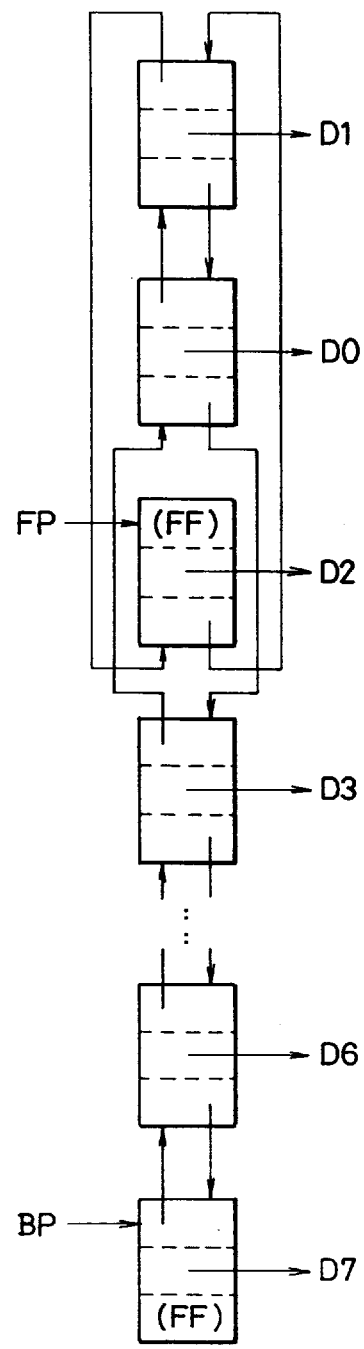

FIG.9
(e) ACCESS OF DATA D7 (BACKWARD POINTER IN THE UPPER SECTION/ FORWARD POINTER IN THE LOWER SECTION)
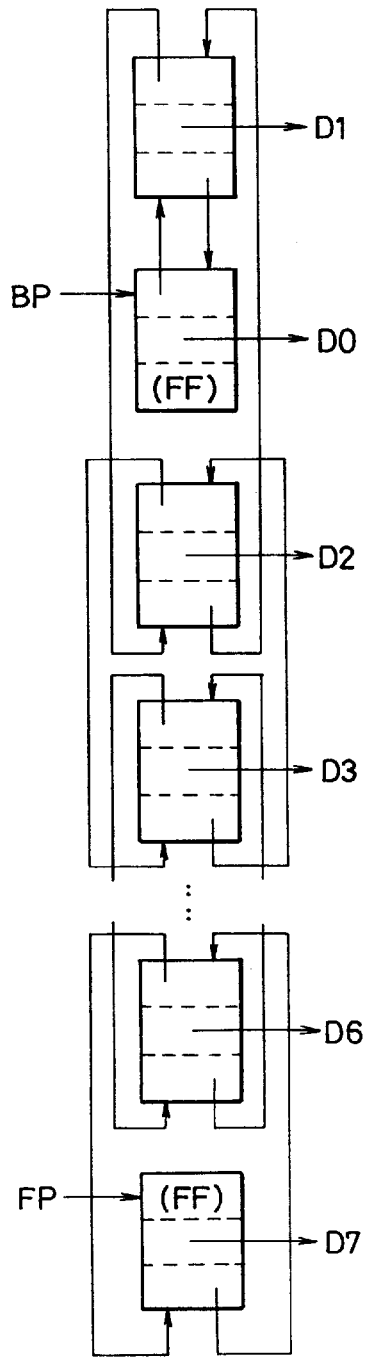
(f) ACCESS OF DATA D8 (BACKWARD POINTER IN THE UPPER SECTION/ FORWARD POINTER IN THE LOWER SECTION)
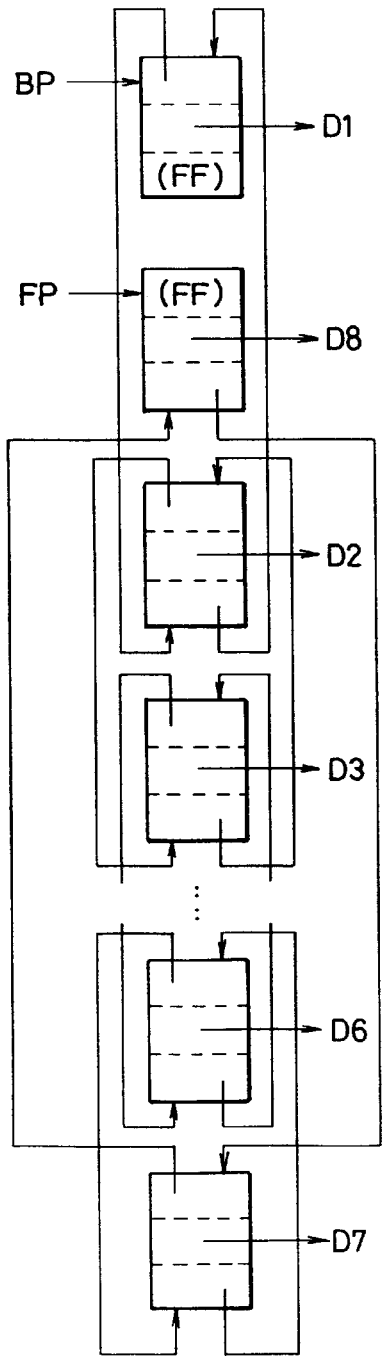

(g)
ACCESS OF DATA D9
(BACKWARD POINTER IN THE UPPER SECTION/
FORWARD POINTER IN THE LOWER SECTION)

FIG.15

SQL1(ACCESSING ALL THE DATA
    IN THE TABLE T1)
        READ T1,D0
        READ T1,D1
          ⋮   ⋮
        READ T1,D9

SQL2(ACCESSING ALL THE DATA          PRIORITY IS CHANGED BECAUSE
    IN THE TABLE T1)                 THE ACCESSING TABLE IS THE
        READ T1,D0                   SAME ONE THAT IS ACCESSED
        READ T1,D1                   BY THE FIRST COMMAND
          ⋮   ⋮
        READ T1,D9

SQL3(ACCESSING ALL THE DATA          PRIORITY IS NOT CHANGED
    IN THE TABLE T2)                 BECAUSE THE ACCESSING TABLE
        READ T2,D10                  IS DIFFERENT FROM THAT OF
        READ T2,D11                  THE PREVIOUS COMMAND
          ⋮   ⋮
        READ T2,D18

SQL4(ACCESSING ALL THE DATA          PRIORITY IS NOT CHANGED
    IN THE TABLE T3)                 BECAUSE THE ACCESSING
        READ T3,D20                  TABLE IS DIFFERENT FROM
          ⋮   ⋮                      THAT OF THE PREVIOUS
        READ T3,D23                  COMMAND

SQL5(ACCESSING ALL THE DATA          PRIORITY IS CHANGED BECAUSE
    IN THE TABLE T3)                 THE ACCESSING TABLE IS THE
        READ T3,D20                  SAME ONE THAT IS ACCESSED
          ⋮   ⋮                      BY THE PREVIOUS COMMAND

PRIORITY-BASED MEMORY MANAGEMENT METHOD AND APPARATUS

BACKGROUND OF THE INVENTION

1. Field of the Invention

This invention relates to a memory apparatus, specifically, a cache memory apparatus, which receives data consecutively and erases the data in order of the low priority according to a specific algorithm. This invention improves a hit ratio especially in the data base processing system by changing the priority of the disk caches.

2. Description of the Related Art

It is effective to improve the speed of accessing to the storage area which has a large capacity as a means for improving the system efficiency. In a conventional system, a high-speed memory apparatus called a cache memory is provided between a CPU and accessing devices, for example a slow-speed memory apparatus, a disk drive, and so on. Such high-speed memory apparatus is priced high. Therefore, it is difficult to have a capacity large enough to cover all the accessing storage area, so the cache memory apparatus generally has a small capacity. Transmission between such a memory apparatus and the storage area is performed in fixed block units. In case that the cache memory apparatus has data for accessing, the data can be accessed in a short access time. In case that the memory apparatus does not have data for accessing, the data should be taken from the storage area. As the possibility to have data for accessing in the memory apparatus gets higher, the efficiency of the total system increases. Therefore, it is desirable that the cache memory apparatus should be so managed that it erases data block having lower priority for enabling a new block to be written.

In such a memory apparatus, Least Recently Used (LRU) algorithm is adopted as a means for giving priority.

This algorithm is based on a concept that some elements of a program in a main memory are repeatedly used at the execution time of the program. Accordingly, the efficiency of the program at the execution time increases if the repeatedly used elements always exist in a cache memory apparatus.

As to a disk drive, the algorithm is based on a concept that access requests to data have a tendency to concentrate on a specific block. On the other hand, in some services, all the blocks on the disk drive are accessed impartially. When the LRU algorithm is adopted in this case, probability of accessing data blocks in the cache memory apparatus is reduced.

Further, an index is used as a method of accessing a large amount of data with high-speed. For example, in the data base processing system, in a fixed processing, there is a tendency that specific data items to be read out are limited. It is possible to set up the index about these items in advance. For example, if an index is set up to an item "man-number", it is possible to perform high-speed retrieval only by using the index without checking the data file.

On the other hand, in a non-fixed processing, there is a tendency that an arbitrary retrieval is performed so as to accept a demand which occurs at random. Therefore, it is difficult and not practical to set up the index previously corresponding to the demand. As a result, it is needed to search all the data recorded in one table or file so as to retrieve the data satisfying the indicated retrieval condition.

The probability of the requested data being in the cache memory is called hit ratio.

In the data base processing, especially in the non-fixed processing, data access is likely performed to the same table repeatedly. Data on the table are stored in the disk cache area on the memory apparatus from the disk drive. In case that the table is small enough to be included in the disk cache area, it is possible to access data at high speed because the disk cache can hit data except for the first data access. But when the size of the table goes over the disk cache area, it is possible that the cache area is ineffective.

For example, a command based on Structured Query Language (SQL) may be issued to the data base in a non-fixed processing. SQL is an operation language for performing the process of retrieval, update, and delete on the data base. As described before, in a non-fixed processing, there are many cases that all data in the specific table are searched without the index. On the other hand, as described before, the cache memory is designed based on the idea that data accesses are partial or clustered on some data on the cache memory. That is, if the priority is given to the partial data based on the clustered data accesses, the existing probability of frequently accessed data in the disk cache increases. Therefore, in case that such a precondition is not adapted, in other words, in case that the access is not partial nor clustered, the disk cache itself sometimes comes to be useless.

An explanation will be made hereinafter, referring to the case that all the data blocks on the disk cache are accessed, in connection with the attached figures.

FIG. 23 is a block diagram illustrating a configuration of a conventional memory apparatus. In the figure, a cache memory 10 and a cache management information 3 are provided. A means for giving priority 20 gives priority to the data stored in the cache memory 10. A means for erasing 40 erases data orderly from the data with lower priority given by the means for giving priority 20. A memory controller 150 controls these elements.

FIG. 24 illustrates the operation of a conventional disk cache area. To simplify a description, an explanation is made for the case that this cache memory adopts the LRU algorithm.

In FIG. 24, cache memory area consists of eight blocks, while the disk drive consists of ten blocks. Now there will be explained the case that data D0 to D9 from the disk drive are consecutively stored to the cache memory. In (a) of FIG. 24, data D0 to D7 are already stored to the cache memory area. When this data was stored from the disk drive to the cache memory area, the cache did not hit data.

Next, when data D8 is read from the disk drive as shown in (b) of FIG. 24, the oldest data D0 in (a) of FIG. 24 is discarded and replaced with data D8. Further, when data D9 is read from the disk drive, the oldest data D1 shown in (b) of FIG. 24 is discarded and replaced with data D9 as shown in (c) of FIG. 24. Further, when data D0 is then read from the disk drive, the oldest data D2 shown in (c) of FIG. 24 is discarded and replaced with D0. When data D1 are read from the disk drive, the oldest data D3 in (d) of FIG. 24 is discarded and replaced with data D1. Thus, in case that data from the disk drive are stored repeatedly in order, the cache does not hit data at all and the disk cache is useless.

As has been described, if data in a single table is accessed repeatedly in a data base processing system, in a conventional cache memory, when the size of the table is larger than the cache memory area, the cache memory does not hit data at all because the old data in the disk cache area is replaced with the data at the end of the table. In non-fixed processing, especially, if accesses to the same table are made repeatedly, the cache memory generally is not effective, thus decreasing the efficiency of the whole system.

SUMMARY OF THE INVENTION

It is an object of this invention to obtain a memory apparatus which increases a memory efficiency in case that accesses are performed repeatedly for the same area table in a disk drive, for example in a data base processing of the non-fixed processing.

It is another object of this invention to improve a hit ratio in a disk cache area in case of using a Least Recently Used algorithm.

It is another object of this invention to obtain a memory apparatus which changes the priority and improves the hit ratio in case that it is known in advance that the conventional means for giving priority is not effective.

According to one aspect of this invention, a memory apparatus may include a memory for inputting and storing data, means for giving priority to data stored in the memory based on a priority algorithm, means for erasing data having lower priority and, means for changing priority given to each of the data at some timing point.

In the memory apparatus, a means for changing priority has a reverse means for reversing priority.

In the memory apparatus, the means for giving priority uses a priority algorithm which is based on a concept that data access is partial, or a Least Recently Used algorithm.

In the memory apparatus, the means for giving priority may have a forward pointer and a backward pointer for indicating the order of input data, and the means for changing priority may have a reverse means for reversing the forward pointer and the backward pointer.

In the memory apparatus, the means for changing priority may have a means for shifting priority.

In the memory apparatus, the means for changing priority may have a forward pointer and a backward pointer for indicting the order of input data, and the means for changing priority may have a pointer shift means for shifting the forward pointer and the backward pointer.

In the memory apparatus, the means for giving priority may have First In First Out memory, and may store the order of input data using the First In First Out memory, and the means for changing priority may change the order of input data stored in the First In First Out memory.

In the memory apparatus, the means for giving priority may have a stack memory for storing the order of input data using the stack memory, and the means for changing priority may change the order of input data stored in the stack memory.

In the memory apparatus, the memory may be a disk cache memory, or alternatively the temporary storage device of a communications system.

The memory apparatus may further include a timing detector for detecting the timing point to change priority, and the timing detector may detect the timing point to change priority by inputting and analyze a data retrieval command for retrieving data. The timing detector may also input and analyze the data retrieval command written in Structured Query Language.

The memory apparatus may further include a means for determining a start of an operation as the means for changing priority.

The timing detector may detect the timing point to reverse priority, and the means for changing priority may reverse the priority referring to the timing point detected by the timing detector.

The timing detector may further detect the timing point to shift the priority, and the means for changing priority may shift the priority referring to the timing point detected by the timing detector.

According to one aspect of this invention, a method is disclosed for managing a memory apparatus, inputting data orderly, and storing the input data given priority based on a priority algorithm in a memory apparatus, and erasing data having lower priority from the memory. The method includes the steps of detecting a timing point to change priority of input data stored in the memory apparatus, recognizing a needs of changing priority of data stored in the memory apparatus and, changing priority of data stored in the memory apparatus, when the step of detecting the timing point detects the timing point to change the priority and the step of recognizing the needs recognizes the needs of changing the priority of data stored in the memory apparatus.

In this method, the step of detecting the timing point includes a step of analyzing a data retrieval command for retrieving data so as to detect the timing point to change priority.

In this method, the step of analyzing may have a step of judging the timing point when the data retrieval command is a reference command for all the data on one table.

In this method, the step for recognizing the needs may have a step of storing a plurality of access results of data stored in the memory apparatus, and a step of judging the needs for changing priority based on the stored access results.

In this method, the step of judging the needs may have steps of calculating the hit ratio from the access results, and deciding the needs of changing priority when the hit ratio is below a threshold value. Alternatively, it may have steps of counting the consecutive number of non-hit access times based on the access results, and deciding the needs of changing priority when the number of consecutive non-hit access times is below a fixed threshold value.

The method for managing the memory apparatus may further include a step of giving priority by chaining data with a pointer, wherein the step of changing priority has a step of changing chains of the pointer.

In the method for managing the memory apparatus, the step of changing chains may have a step of reversing the head and the tail of the chain, or a step of shifting the head of the chain.

BRIEF DESCRIPTION OF THE DRAWINGS

FIG. 5 shows a cache management information of the memory apparatus based on this invention.

FIG. 8 shows the access operation of the third and fourth step of the second cycle of the disk cache memory based on the first preferred embodiment of the memory apparatus.

FIG. 9 shows the access operation of the fifth and sixth step of the second cycle of the disk cache memory based on the first preferred embodiment of the memory apparatus.

FIG. 15 shows the process of deciding a start of changing priority based on this invention.

DESCRIPTION OF THE PREFERRED EMBODIMENTS

Embodiment 1.

Figure 1:
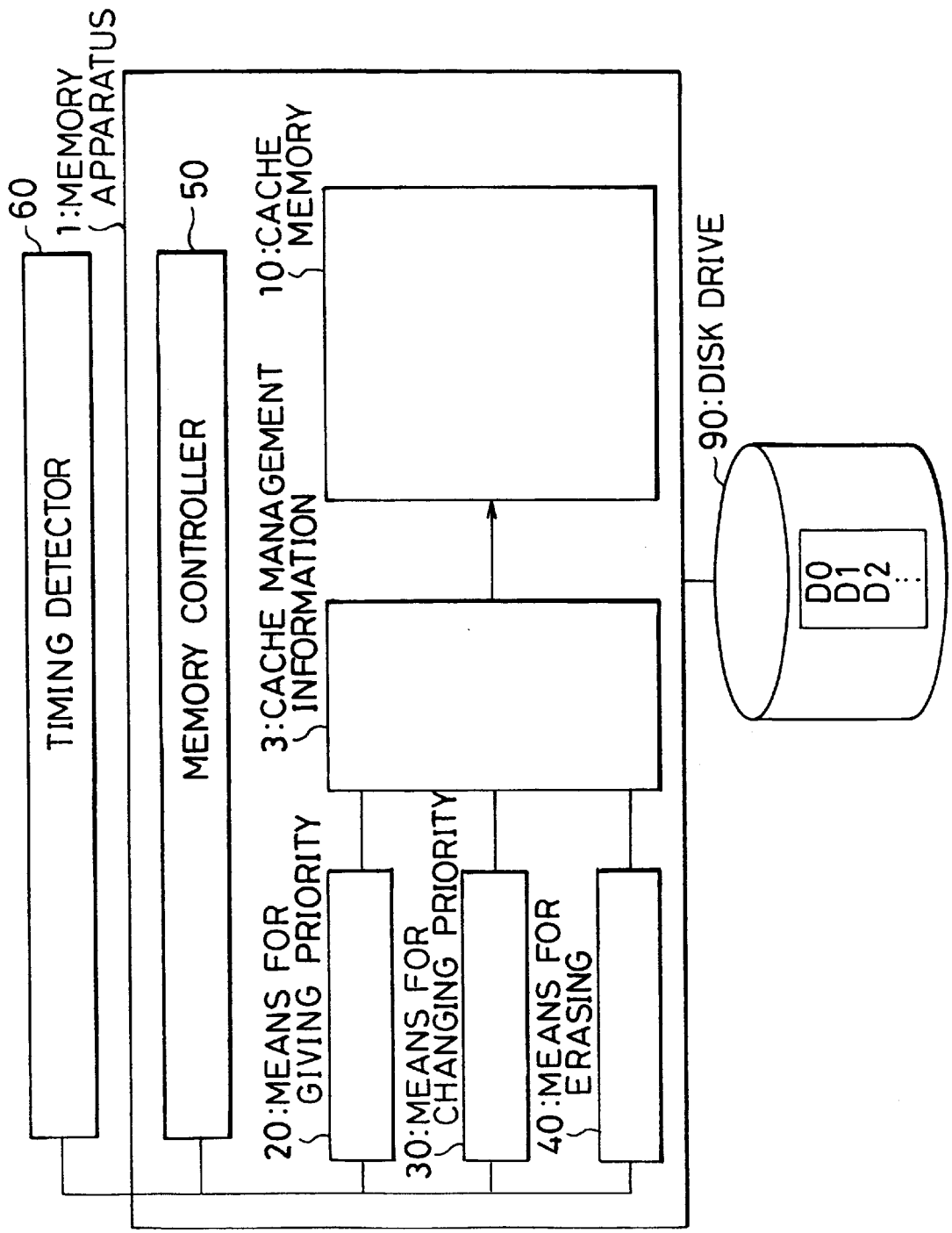
FIG. 1 shows a configuration of a memory apparatus based on this invention.

FIG. 1 illustrates a configuration of a memory apparatus of this invention. A memory apparatus 1 is provided. A cache memory 10 stores data in the memory apparatus 1. A cache management information 3 manages the cache memory 10.

A means for giving priority 20 gives priority for the stored data in the cache memory 10. A means for changing priority 30 changes the priority given to data at a fixed timing.

A means for erasing 40 erases data given lower priority. A memory controller 50 controls these elements. A disk drive 90 and a timing detector 60 are also provided.

Figure 2:
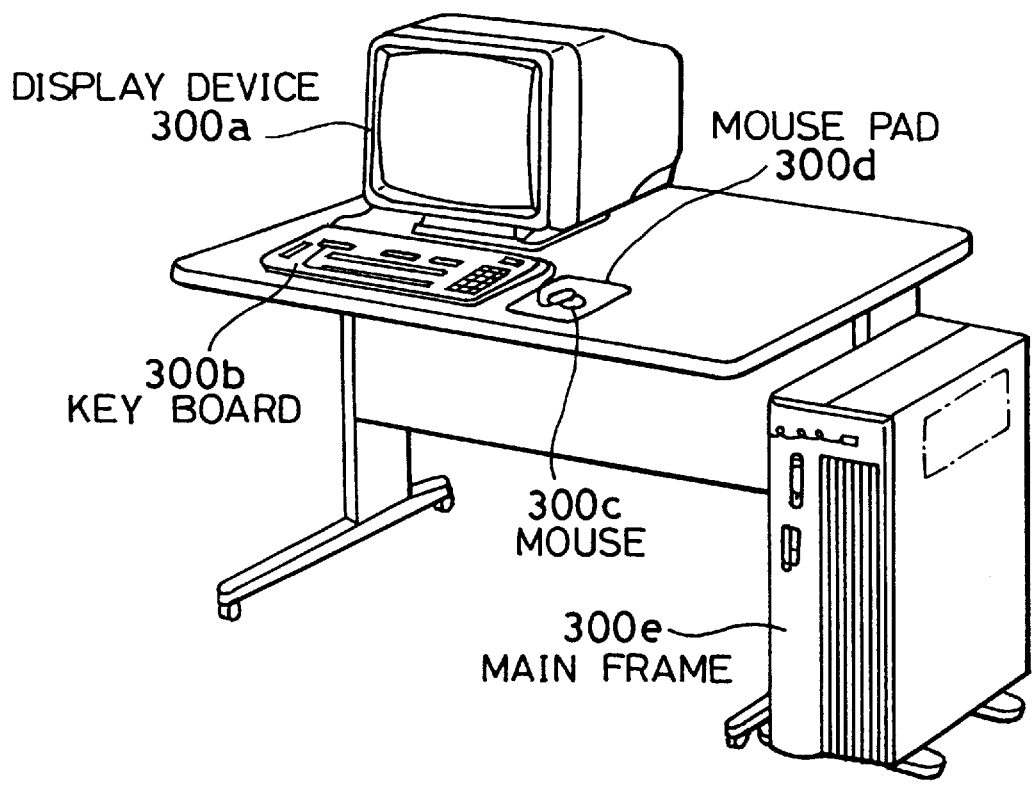
FIG. 2 shows a configuration of a work station loading the memory apparatus based on this invention.

FIG. 2 illustrates a configuration of a work station loading the memory apparatus as shown in FIG. 1. In the figure, a display device 300a indicates the information. A keyboard 300b inputs characters and figures, a mouse 300c and a mouse pad 300d indicates an arbitrary location of a display apparatus. A main frame 300e is a system unit of the work station.

Figure 3:
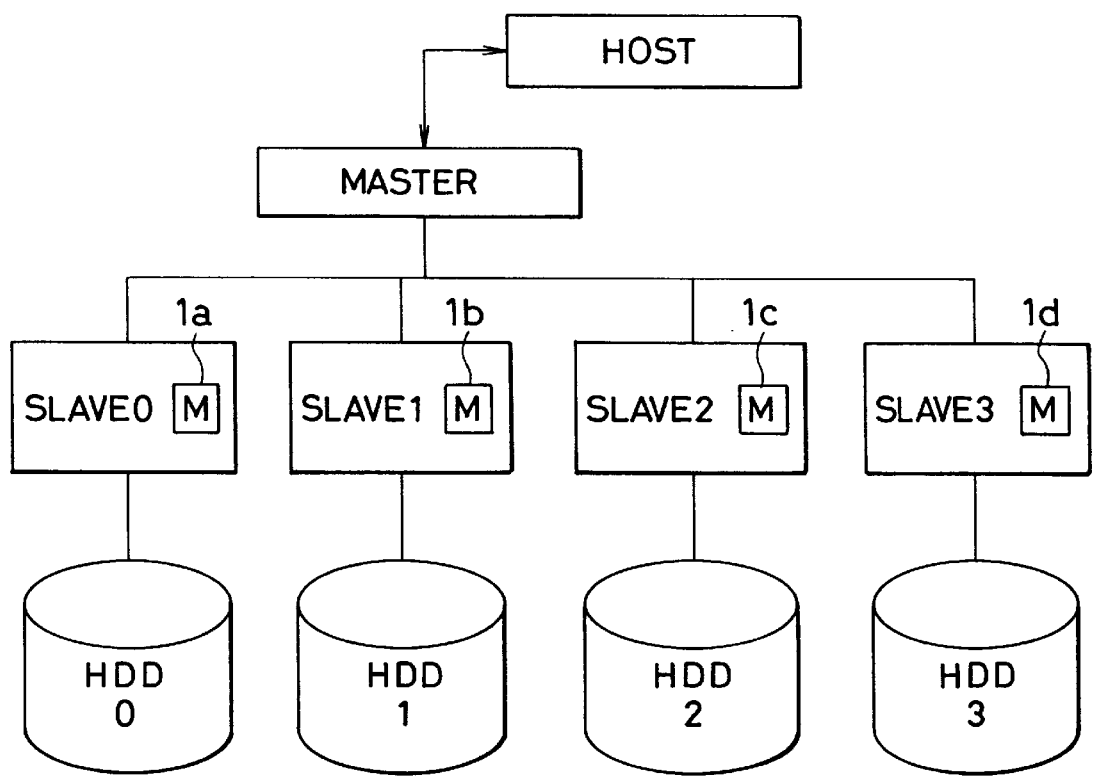
FIG. 3 shows a system configuration in which the memory apparatus on this invention can be applied.

FIG. 3 illustrates one of examples of the memory apparatus based on this invention. FIG. 3 shows a configuration of a high-speed data access machine. A plurality of slaves are connected to a master and the slaves have the memory apparatus 1a, 1b, 1c, and 1d respectively. Further, each of the slaves connects a disk drive. Thus, the hardware configuration forms one data base as a whole. For data base access request from a host computer, the master and the slaves distributes data in the disk drive and paralleling the processing. Then the effective data base access is provided to the host computer. In each of the slaves of such a high-speed data access machine, it is possible to apply this invention.

Figure 4:
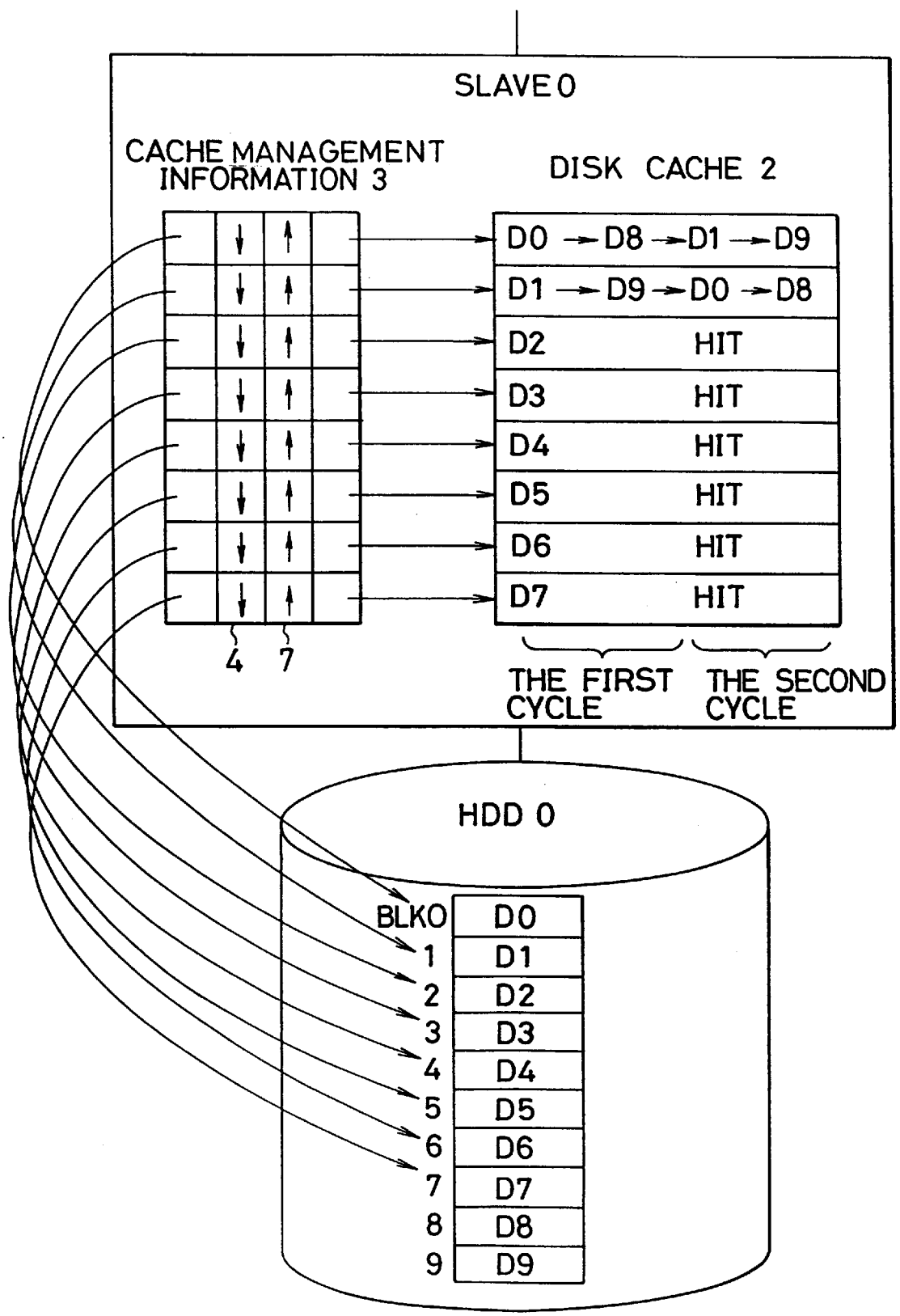
FIG. 4 shows a configuration of the memory apparatus based on this invention.

FIG. 4 illustrates a block diagram showing a configuration of the above-mentioned memory apparatus. The memory apparatus, shown for SLAVE 0, has the cache management information 3 and the disk cache 2. The disk cache 2 temporarily holds cache data stored from the disk drive. The cache management information 3 is for storing the information of data stored in the disk cache.

FIG. 5 illustrates the contents of each entry of the cache management information 3 in a particular embodiment. Hereafter, each entry is called a cache management information entry. The cache management information entry has a forward/backward pointer 4, a pointer to the disk cache 5, a pointer of a data location in the disk drive 6, and backward/forward pointer 7. Each of the forward/backward pointer 4 and the backward/forward pointer 7 is sometimes used as a forward pointer and sometimes used as a backward pointer. When either is used as the forward pointer, it chains in order of the most recently accessed data. When either is used as the backward pointer, it chains in order of the oldest accessed data. The pointer to the disk cache 5 uses the address assigned on the disk cache 2. The pointer of a data location in the disk drive 6 shows the position of the data stored in the disk. Address of the disk drive is usually used as a pointer. For example, as shown in FIG. 4, the pointer of this data location in the disk drive can use block numbers.

For the purpose of showing the operation of the memory apparatus configured as described, it is assumed that data in the table include blocks BLK 0 to BLK 9. Each of the blocks stores data through D0 to D9 respectively. Further, blocks in the cache have block numbers 0 to 7. In case of erasing data from the cache, Least Recently Used (LRU) algorithm is used. That is, data are orderly determined to be erased from the oldest one.

In a data base processing system comprising a memory apparatus, an explanation is made for the case that Structured Query Language (SQL) commands, which retrieve all the data on a table, are issued. Hereafter, one SQL command is executed as one cycle, such that the access of all the data block in one table is referred to as one cycle.

LRU algorithm is adopted here because it is typical among those based on the concept that data for accessing is partial or clustered. Accordingly, other algorithm can be adopted.

Figure 6:
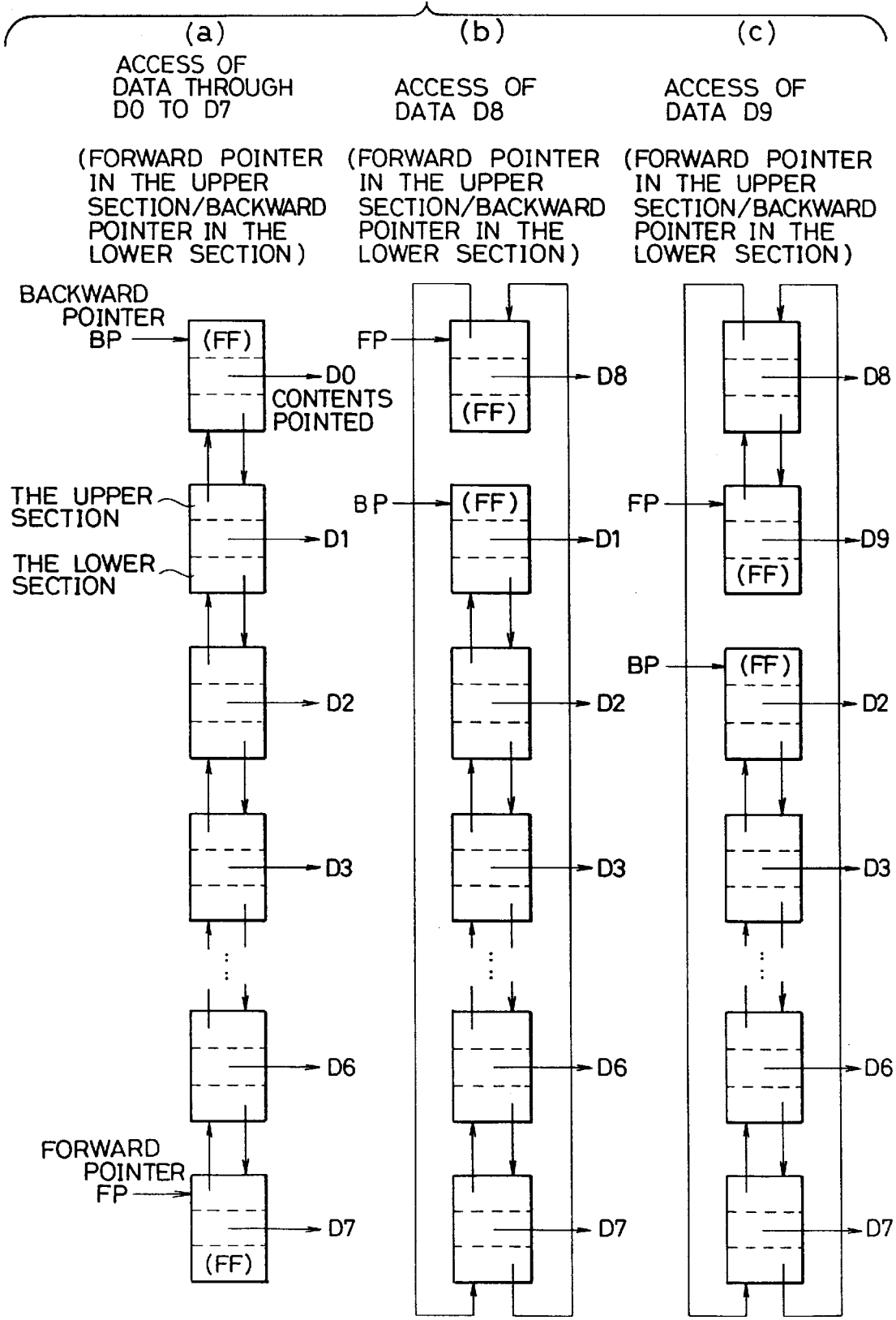
FIG. 6 shows the access operation of the first cycle of a disk cache memory based on the first preferred embodiment of the memory apparatus.

To simplify the description of the first cycle, in FIG. 6 to FIG. 11 and FIG. 20, the pointer 6 of the data location in the disk drive is not illustrated. (a) of FIG. 6 shows data D0 to D7 accessed from the disk drive. In (a) of FIG. 6, each forward pointer sequentially points to data from the most recent one pointed to by a forward pointer FP, and each backward pointer sequentially points to data from the oldest one pointed to by a backward pointer BP. FF shows an end of pointer.

In (b) of FIG. 6, there is shown the case that data D8 is read by further accessing from the disk drive in (a) of FIG. 6. In (b) of FIG. 6, the oldest data D0 in (a) of FIG. 6 is discarded and the data D8 recently read is written on. Therefore, the forward pointer points to the cache management information entry of data D8. Further, the backward pointer points to the cache management information entry D1. And, when data D9 is accessed from the disk drive, as shown in (c) of FIG. 6, the oldest data D1 is replaced with the data D9 as shown in (c) of FIG. 6. At this time, the forward pointer FP points to the cache management information entry of D9 and the backward pointer BP points the cache management information entry of D2. When the accesses of data through D0 to D9 finishes, the first cycle ends.

Figure 7:
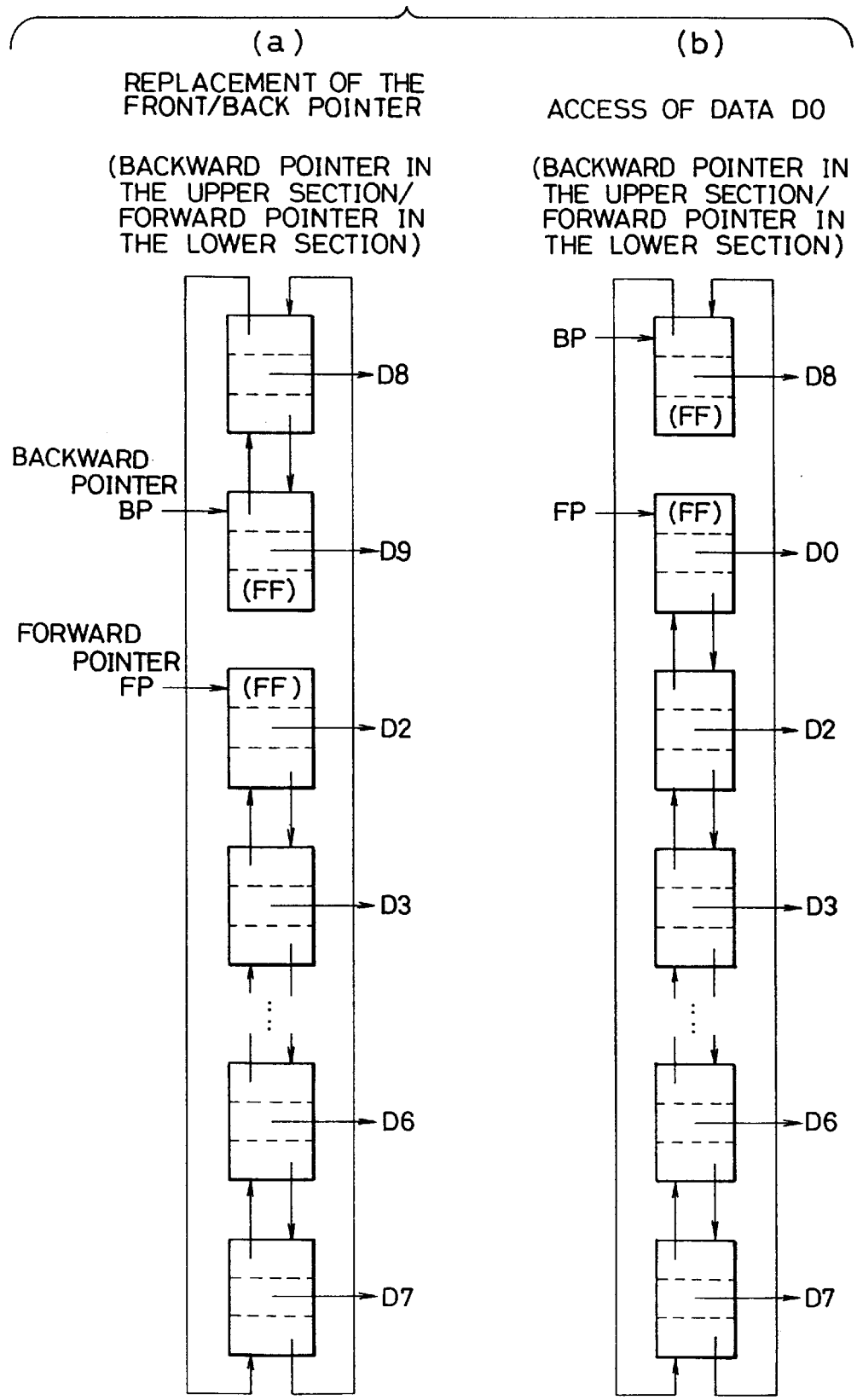
FIG. 7 shows the access operation of the first and second step of the second cycle of the disk cache memory based on the first preferred embodiment of the memory apparatus.

FIG. 7 and FIG. 8 show an explanation of the second cycle. In the second cycle, data through D0 to D9 are read again. Before this procedure, the forward pointer is exchanged with the backward pointer. Accordingly, the backward pointer BP points the cache management information entry of D9, and the forward pointer FP points the cache management information entry of D2. By exchanging these pointers, the oldest data is regarded as the most recent data, and the most recent data is regarded as the oldest data.

Under these conditions, when data D0 is accessed to the disk drive, data D9 is replaced with the oldest data D1 as shown in (b) of FIG. 7. At this point, the backward pointer BP points the cache management information entry of D8. The forward pointer FP points the cache management information entry of D0. Further, when data D1 is accessed to the disk drive, the oldest data D8 is replaced with data D1 as shown in (c) of FIG. 8. The forward pointer FP now points the cache management information entry of D1, and the backward pointer BP points the cache management information entry of D7.

Further, When data D2 is accessed, the disk cache hits data because the disk cache already has the data D2 as shown in (d) of FIG. 8. Accordingly, data D2 is not read actually from the disk drive, but data of the cache memory are used. At this point, the forward pointer FP points the cache management information entry of D2. The backward pointer continues to point the cache management information entry of D7 as shown in (c) of FIG. 8. Thus, when data D2 is accessed, because the disk cache already has the data, the disk cache hits data and the actual data are not read from the disk drive. When data D3, D4, D5, . . . , D7 are accessed in the same way, because the disk cache already has these data, the actual data is not read from the disk drive. Only the update of the forward pointer and the backward pointer and the change of the backward pointer and the forward pointer is carried out. (e) of FIG. 9 shows that access of data progressed to data D7. At this point, the forward pointer FP points the cache management information entry of D7. And the backward pointer BP points the cache management information entry of D0. Further, when data D8 is accessed at this point, as shown in (f) of FIG. 9, the oldest data D0 is replaced with the new data D8. At this point, the forward pointer FP points to the cache management information entry of D8, and the backward pointer BP points to the cache management information entry of D1.

Figure 10:
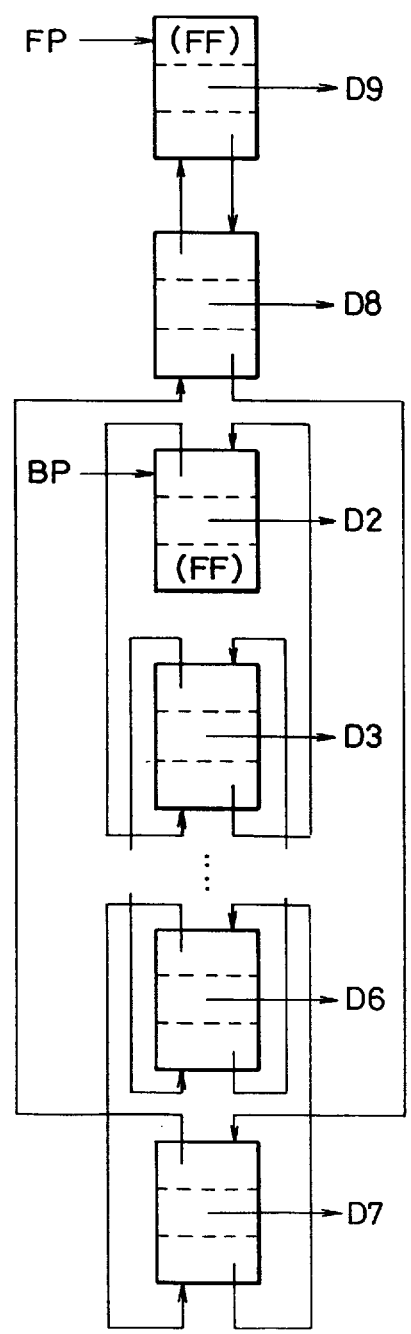
FIG. 10 shows the access operation of the seventh step of the second cycle of the disk cache memory, based on the first preferred embodiment of the memory apparatus.

Further, when data D9 is accessed as shown in (g) of FIG. 10, the oldest data D1 is replaced with the data D9. The forward pointer points to the cache management information entry of D9 and the backward pointer points to the cache management information entry of D2.

As has been described, the second cycle ends. Ten data through D0 to D9 have been accessed during the running of the second cycle and the disk cache hits data as to the data D2 to D7. Accordingly, six data are hit among ten data, and hit ratio becomes 60%.

Figure 11:
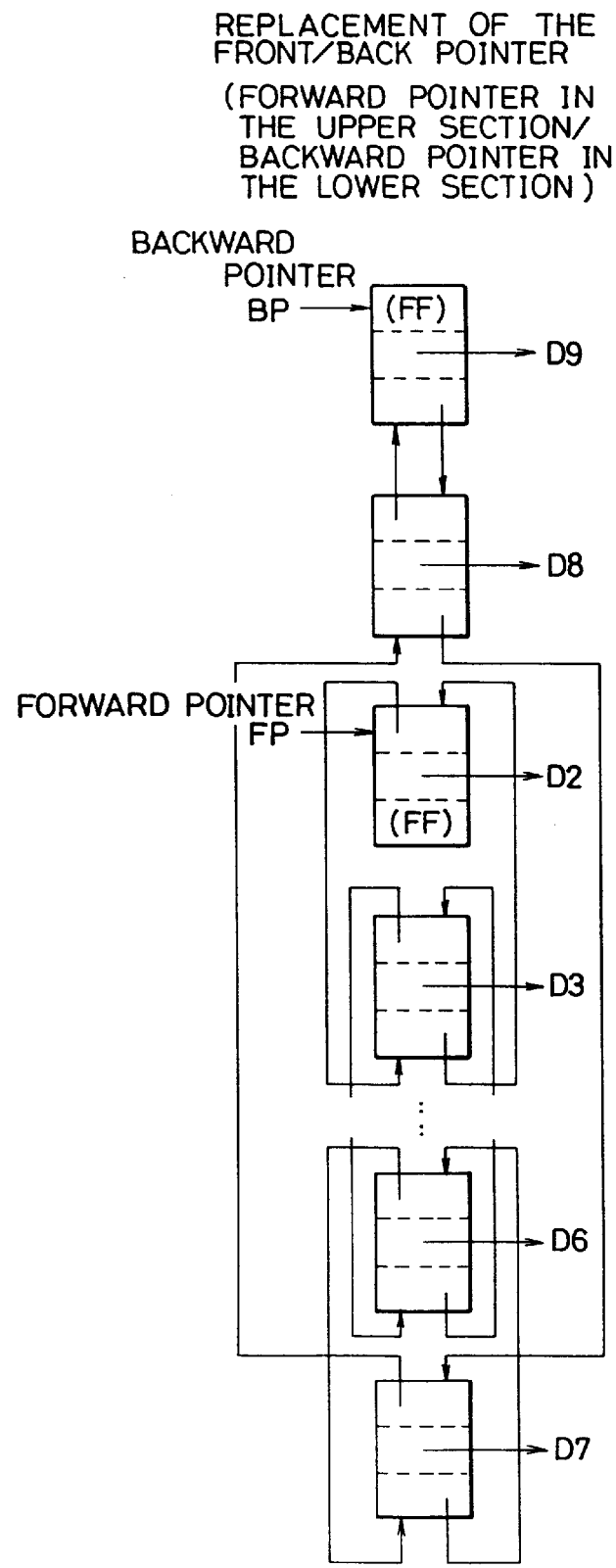
FIG. 11 shows the access operation of the third cycle of the disk cache memory based on the first preferred embodiment of the memory apparatus.

There is shown an operation of the third cycle, referring to FIG. 11. Before starting the operation of the third cycle, exchange of the forward pointer and the backward pointer is performed. Accordingly, the forward pointer FP points to the cache management information entry of D2 and the backward pointer BP points to the cache management information entry of D9. At this point, when the cache data is regarded as old in the following order; data D9, D8, D7, . . . , D3, D2.

In the third cycle, when data through D0 to D9 are accessed, the cache data of D9 and D8 are replaced with access of D0 and D1. When data through D2 to D7 are accessed, the disk cache hits data because the disk cache has data through D2 to D7. When data through D8 and D9 are accessed, the disk cache does not hit data because the disk cache does not have these data. Then, the old data D0 and D1 are replaced instead.

Thus, the third cycle ends. In this cycle, six data through D2 to D7 are hit among ten accesses. As a result, the hit ratio is 60%.

Figure 12:
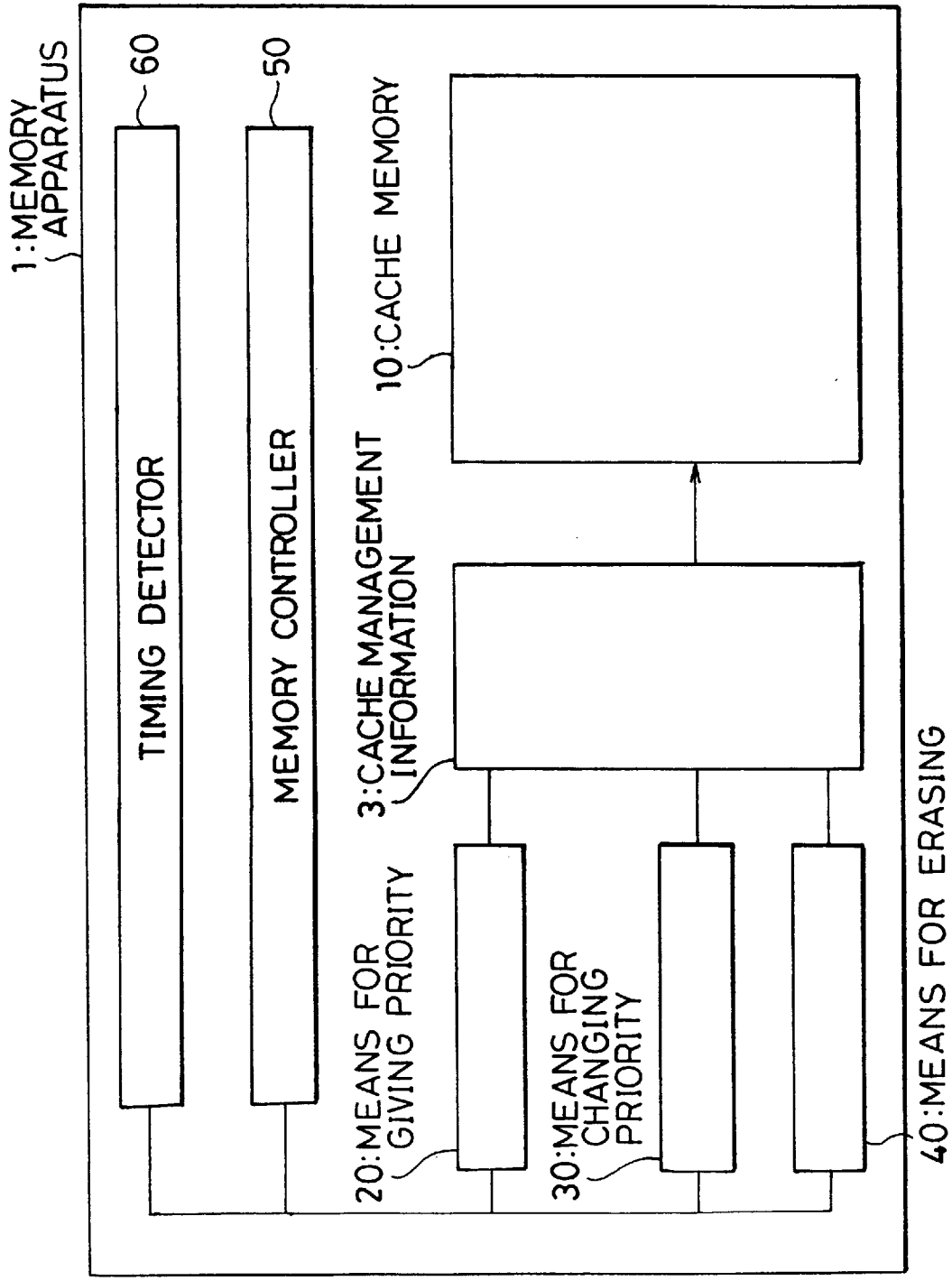
FIG. 12 shows another configuration of the memory apparatus based on this invention.

Further, in this embodiment, as shown in FIG. 1, a timing detector 60 is placed outside of the memory apparatus. As shown in FIG. 12, the timing detector 60 can be placed in the memory apparatus.

As has been described in this embodiment, there is shown the case that there are eight cache blocks and the table has ten data. However, the invention is applicable for any size cache and table. Here, it is assumed that N number of the cache blocks are provided and the M number of blocks are comprised as the data size. When numeral M <= numeral N, the disk cache hits all the data which are used both in the conventional system and in the invention. And when N<M, in the conventional system, all the cache memory becomes useless by writing data consecutively. In the present system, the disk cache hits the 2N-M number of the data. As in the pre-described case, when the number of the cache blocks N=8, the table size M=10, and 2N-M=2×8-10=6, the disk cache hits six data among ten data. Further, when 2N<=M, because all the cache memory are consequently rewritten both in the conventional system and in the present system, all the cache memory is ineffective.

Embodiment 2.

In the above embodiment, there is shown the case that ten data are accessed in each cycle and that the forward pointer is exchanged with the backward pointer in each cycle. The timing point of exchanging the forward pointer with the backward pointer can be after a command finishes or before a command starts. In another embodiment, the table to which the previous command is accessed is memorized and the forward pointer and the backward pointer can be exchanged when the access request is for the same table as the previous command. Further, it is possible to exchange the forward pointer with the backward pointer in case of hit in the cache memory consecutively failing more than a certain number, for example ten times.

In other cases, it is possible to change priority if the hit ratio of the disk cache memory is below a threshold value.

In the above described embodiments, one cycle is described as an execution of one SQL command. However, in case that one SQL command is executed, a plurality of commands is issued for accessing to the disk cache memory apparatus from the disk controller. It is also possible that these commands can be used for detection of timing.

Figure 13:
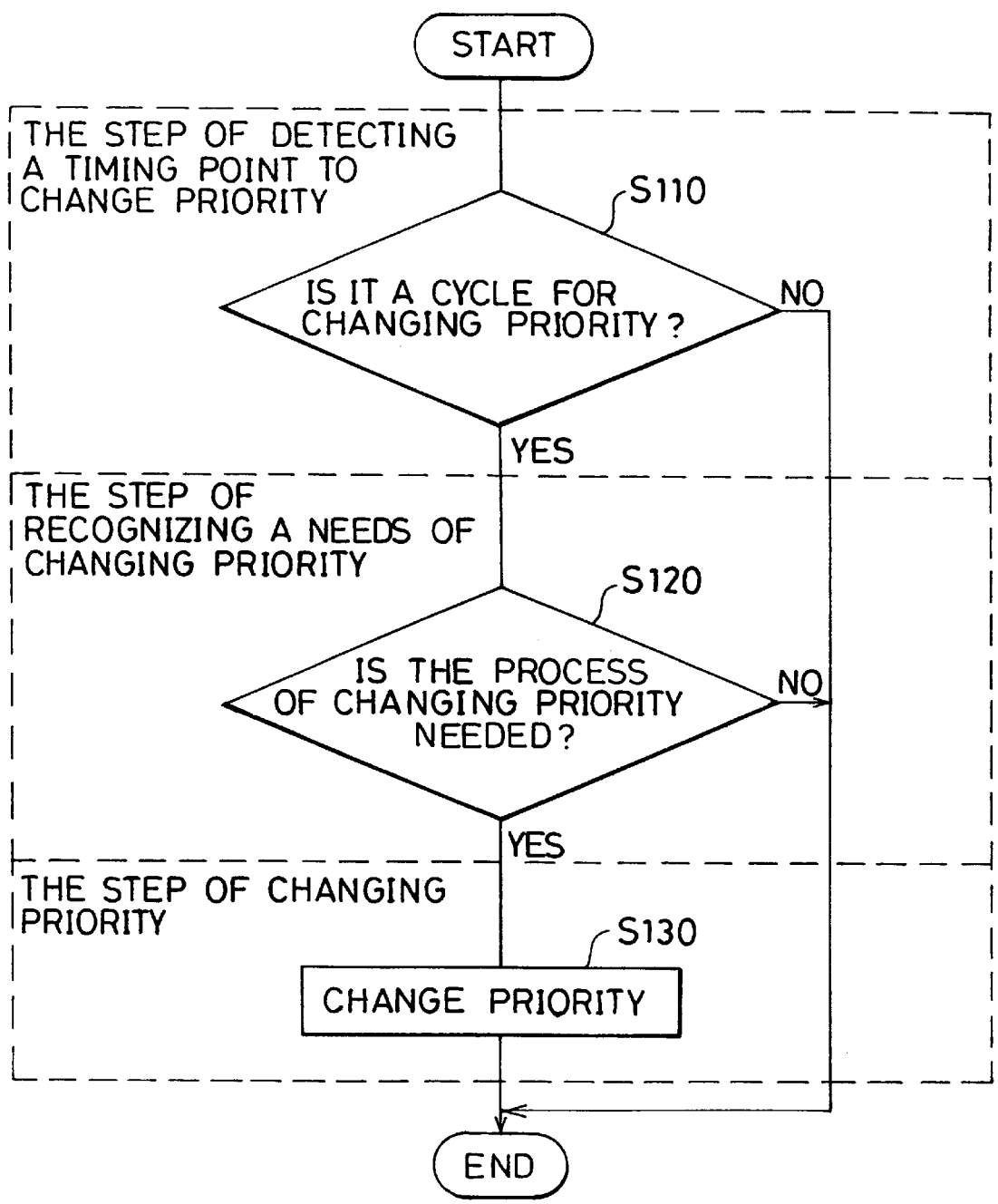
FIG. 13 shows a flow-chart of the process of changing priority based on this invention.

FIG. 13 illustrates a flow chart of changing the priority. First, at step S110 it is judged whether it is a cycle for changing priority. If the answer is in the negative, the process is completed. If the answer is in the affirmative, it is judged at step S120 whether the changing the priority is required. If the answer is in the negative, the process is completed. If the answer is in the affirmative, the priority is changed at step S130.

Figure 14:
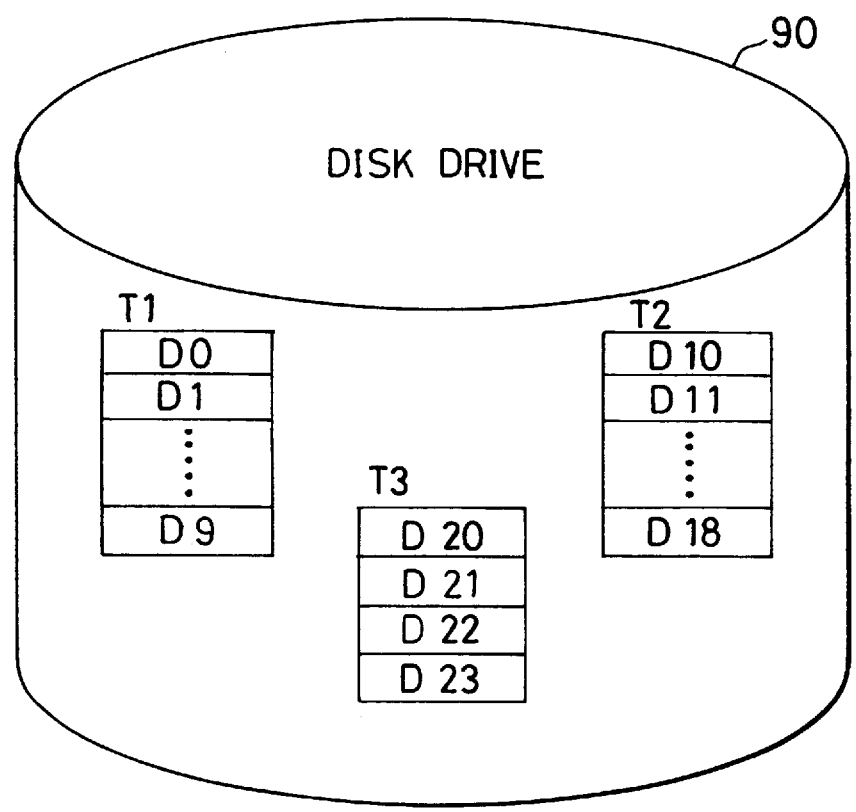
FIG. 14 shows an arrangement of a table based on the second preferred embodiment of this invention.

FIG. 14 illustrates an arrangement of tables in a disk drive 90. In the disk drive, there are three tables T1, T2, and T3. In table T1, there are ten data blocks, D0 to D9. In table T2, there are nine data blocks, D10 to D18. In table T3, there are four data blocks, D20 to D23.

In FIG. 15, changing priority according to the accessing table is shown. In this case, that five SQL commands are issued. It is assumed that each SQL command accesses all the data in the specified table by the command. Because the operation in the memory apparatus in the cycle for processing one SQL command is the same as described in embodiment before, an explanation is omitted.

First, SQL1 is a command for accessing all the data in the table T1. Because SQL1 is the first command to be executed, changing of priority is not performed. SQL2 is the second command for accessing all the data in the table T1. Because the second command accesses all the data in the same table as the first command, the hit ratio will be low unless priority is changed before the second access. The process of changing priority is performed based on this judgement.

SQL3 is the third command for accessing all the data in table T2. Because the data of table T2 is different from that of the previous SQL2, it is judged that data is not expected to exist in the cache memory. Accordingly, the process of changing priority is not performed.

SQL4 is the fourth command for accessing all the data in the table T3. In this case, the process of changing priority is not performed because the reference table is different from that of the previous command.

SQL5 is the fifth command for accessing all the data in the table T3. In this command, the process of changing priority is performed because SQL5 accesses the same table that is accessed by the fourth command.

Figure 16:
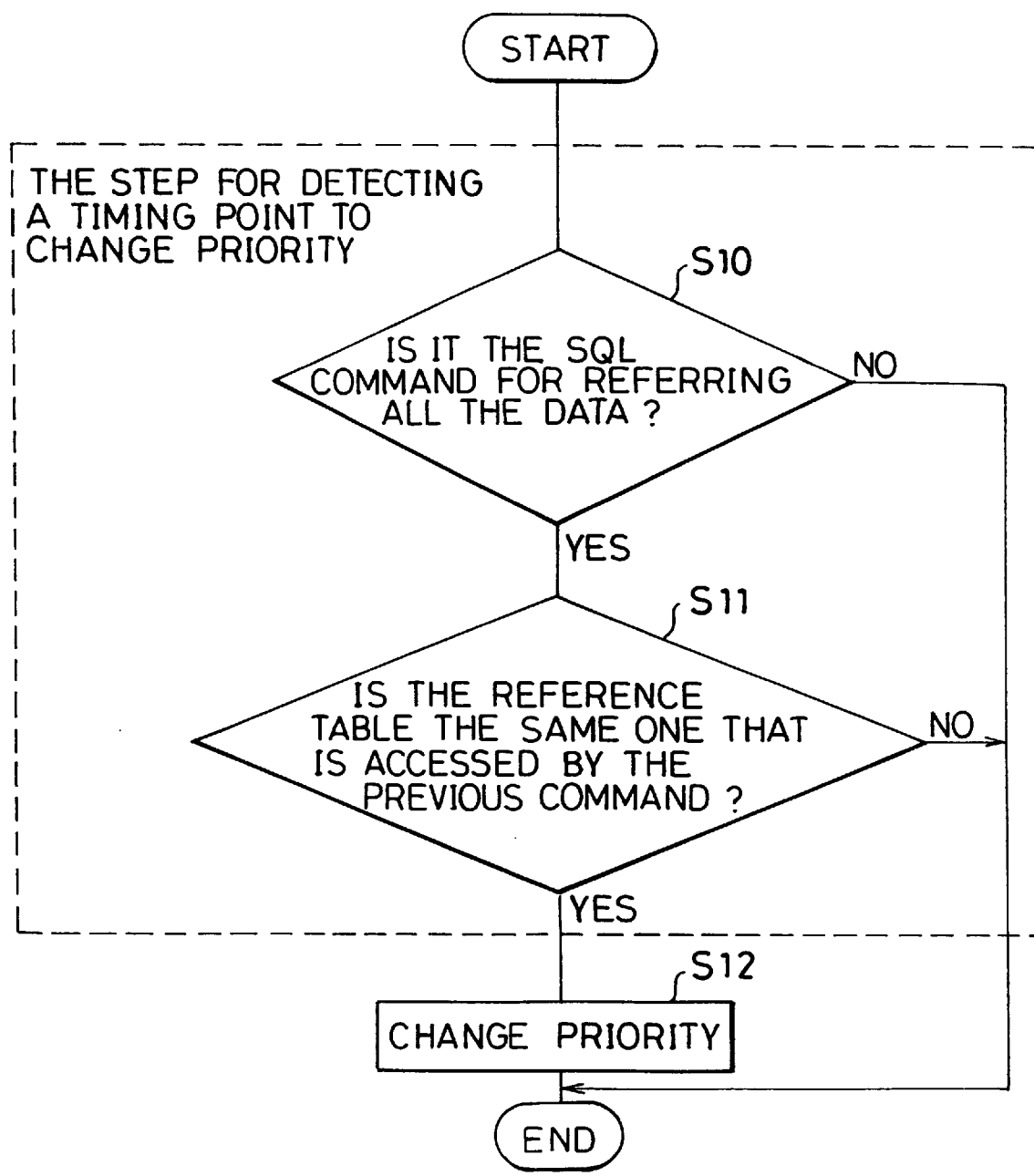
FIG. 16 shows a flow-chart of the second preferred embodiment based on this invention.

FIG. 16 illustrates a flow chart of the above described judgement. First, it is judged whether the requirement from the application is the SQL command for referring all the data. When the answer at S10 is 'No', the process of changing priority is not performed. When the answer is 'Yes', it is judged at S11 whether the reference table is the same as the previous access. Then, when the answer is 'No', the process of changing priority is not performed. On the other hand, when the answer is 'Yes', the process of changing priority is performed at S12.

Further, sometimes it is possible to judge in advance if all the data in the table will be accessed according to the contents of the processing. In this case, it is possible to adopt a method of enabling the operating system, the operator or the application program to control the changing of priority of the memory cache.

Figure 17:
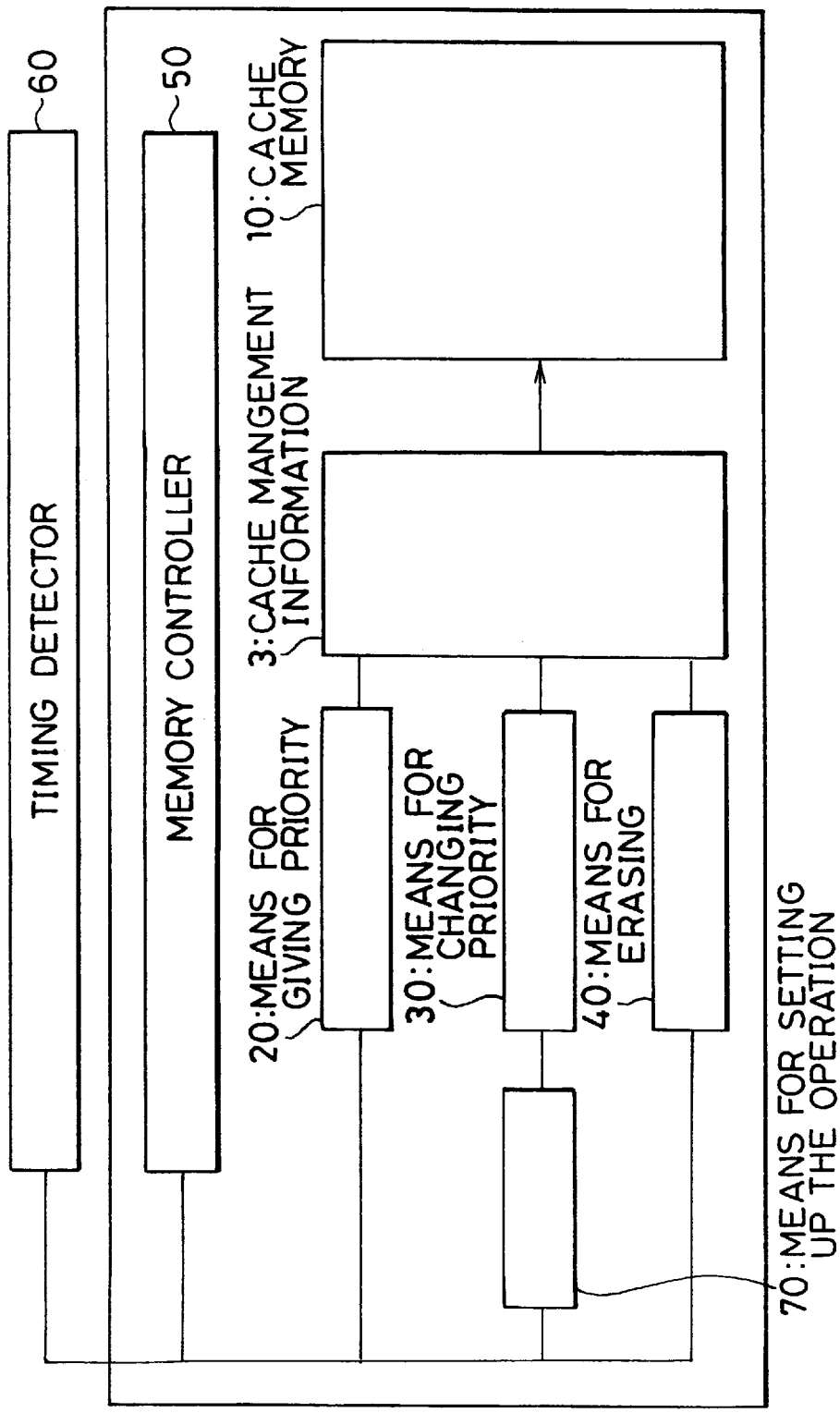
FIG. 17 shows another example of the arrangement of the memory apparatus based on this invention.

FIG. 17 illustrates another example of the arrangement of the memory apparatus based on this invention. In FIG. 17, a means for setting up the operation 70 is included. In the figure, the means for setting up the operation 70 is placed in the memory apparatus but alternatively it can be placed elsewhere. When the means for setting up the operation 70 is set ON, it is judged whether the priority should be changed at a fixed timing, the timing of which may be indicated by timing detector 60. While the means for setting up the operation 70 is set OFF, the memory apparatus is operated according to the conventional means for giving priority without judging if the priority should be changed.

Figure 18:
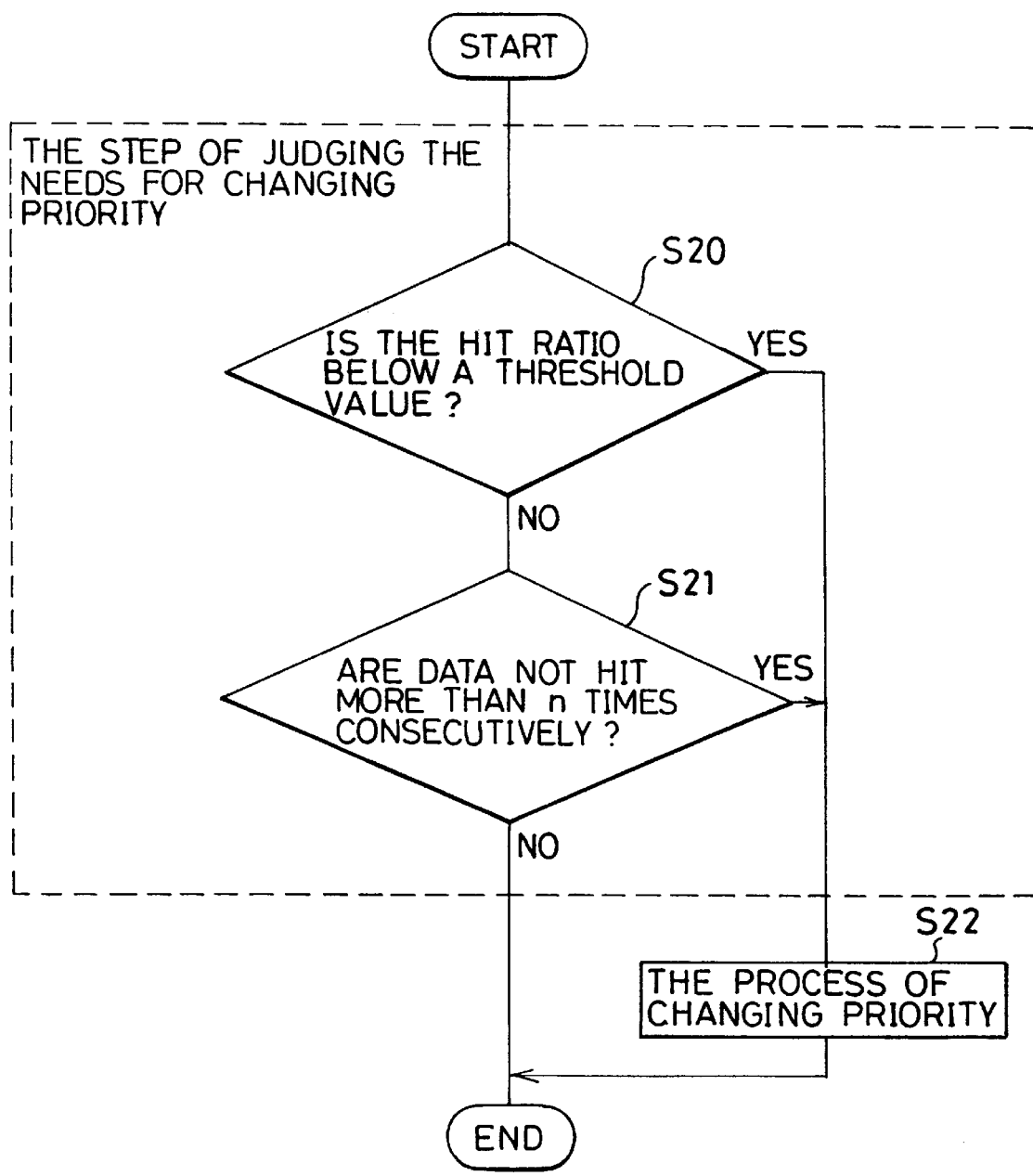
FIG. 18 shows a flow-chart of the second preferred embodiment based on this invention.

FIG. 18 illustrates a flow chart of judgment process for changing priority. First, it is judged at S20 whether the hit ratio is below a threshold value. When the answer is 'Yes', the process of changing priority is performed at S22. When the answer is 'No', it is judged at S21 whether data are not hit more than n times consecutively. In case that data are not hit more than n times consecutively, namely, when the answer is 'Yes', the process of changing priority is performed at S22. Further, when the answer is 'No', the judgement process is completed without changing priority.

Figure 19:
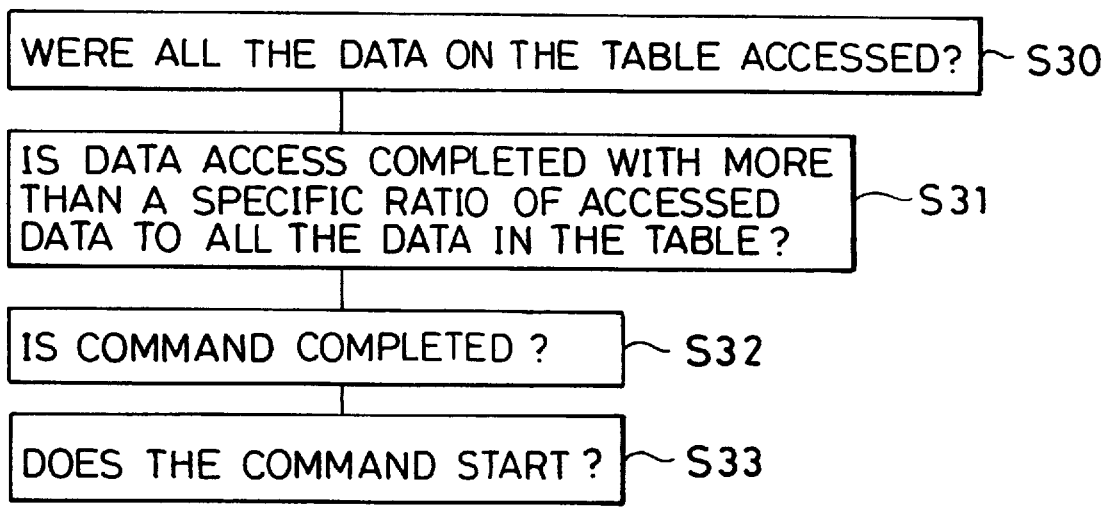
FIG. 19 shows the condition when the timing detector carries out the process of judgement.

FIG. 19 illustrates conditions when the timing detector carries out the judgement process. S30 shows the determination of whether all the data on the table were accessed. S31 shows the determination of whether data access is completed with more than a specific ratio of accessed data to all the data in the table. S32 shows the determination of whether the command is completed, and S33 shows the determination of whether the command starts.

At S31, it is judged whether accessed data against all the data in the table is more than a specific ratio because an arbitral ratio, for example, 70%, can be set. In the pre-described embodiments, it was assumed that the timing of changing priority is when all the data in one table are accessed. In this case, the ratio for accessed data need not always be set at 100%, it can be set at more than 70%, for example.

Further, the timing detector for executing the judgement process can be placed in the memory apparatus, and also can be placed under the control of the operating system and the data base processing system.

Embodiment 3.

In the preceding embodiment, there was shown the case that the priority was reversed by exchanging the forward pointer with the backward pointer. In another embodiment, the forward pointer and the backward pointer can be shifted instead of being reversed.

Figure 20:
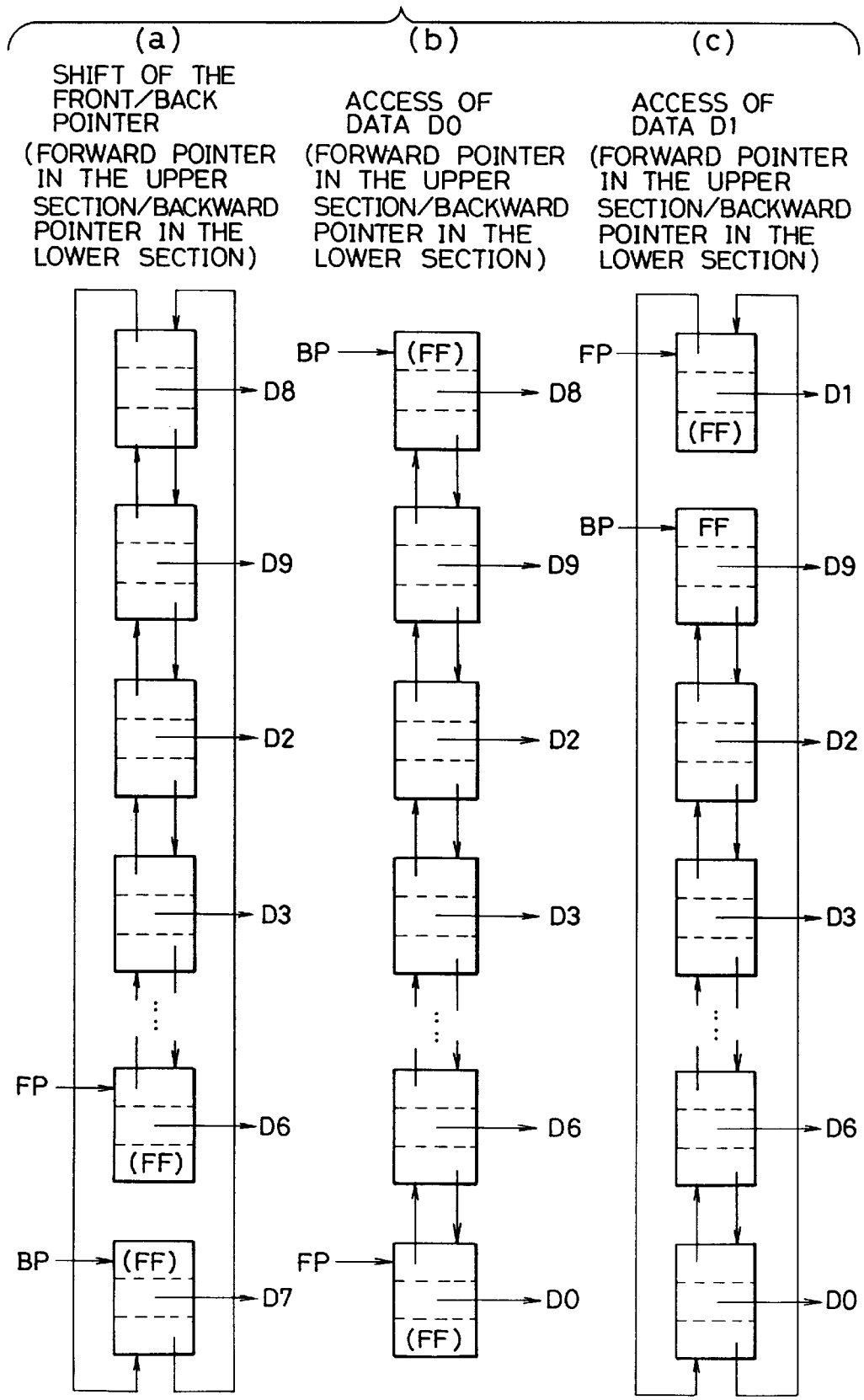
FIG. 20 shows an example of the second cycle of the disk cache memory based on the third preferred embodiment of this invention.

FIG. 20 illustrates that the forward pointer and the backward pointer are shifted. FIG. 20 illustrates that after the first cycle ends, the forward pointer and the backward pointer are shifted by five times from the upper to the lower row. That is, the forward pointer, which pointed to the cache management information entry of D9 in (c) of FIG. 6, here points the cache management information entry of D6 in (a) of FIG. 20. The backward pointer, which pointed to the cache management information entry of D2 in (c) of FIG. 6, here points to the cache management information entry of D7.

Under these conditions, when data D0 is accessed, the oldest data D7 is replaced with the data D0. At this point, the forward pointer FP points to the cache management information entry of D0. The backward pointer BP points to the cache management information entry of D8. When data D1 is accessed, the oldest data D8 is replaced by data D1. The forward pointer FP points to the cache management information entry of D1 at this point. The backward pointer BP points to the cache management information entry of D9. Further, data D2 is accessed under the condition shown in (c) of FIG. 20 because the disk cache already has the data D2, and the cache hits data. When data through D3 to D6 are accessed further, the disk cache also hits data. When data D7 is accessed, the oldest data D9 is replaced with data D7. When data D8 and D9 are accessed, the older data are replaced sequentially. In this way, data through D2 to D6 hit for the access of data through D0 to D9, and the hit ratio becomes 50%.

Embodiment 4.

In the preceding embodiments, there was shown the case that the pointer is reversed or shifted. In another embodiment, the pointer is reset at random.

Embodiment 5.

In the preceding embodiments, there was shown the case that the input order was memorized by using the pointers. However, it is possible to memorize the input order without using the pointer. For example, when the input order is memorized by the First In First Out (FIFO) memory, it is possible to operate as has been described by replacing or shifting the pointers. Other memories such as stack memory can be used instead of the FIFO memory. When the stack memory is used, by reversing data order on the stack and loading data at the bottom of the stack to the top, it becomes effective as described in the preceding embodiment.

Figure 21:
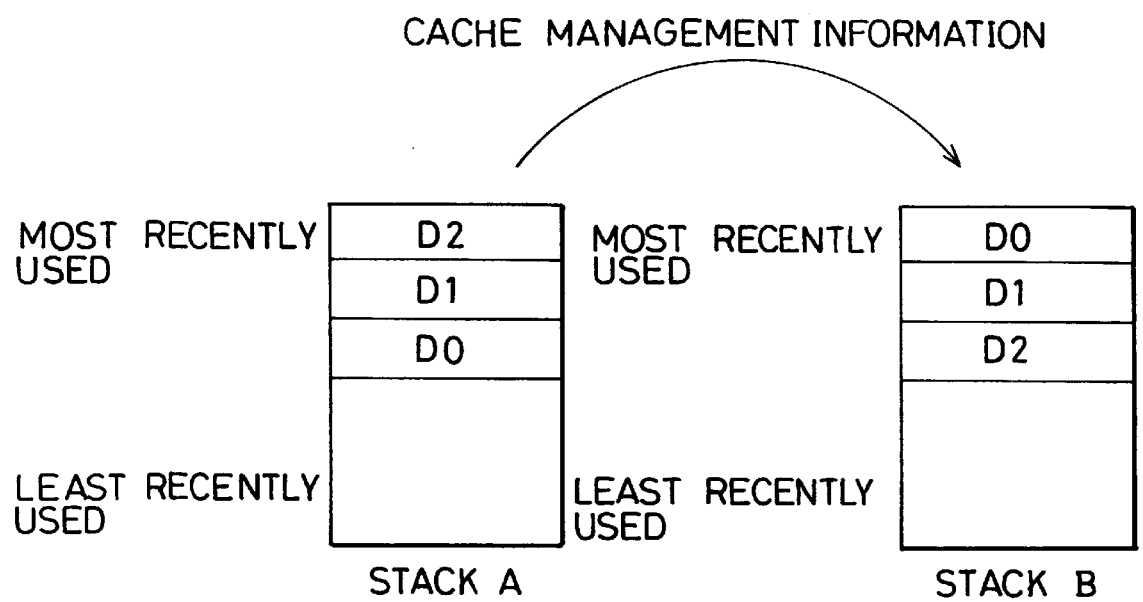
FIG. 21 shows an example of the memory apparatus using a stack memory based on this invention.
Figure 22:
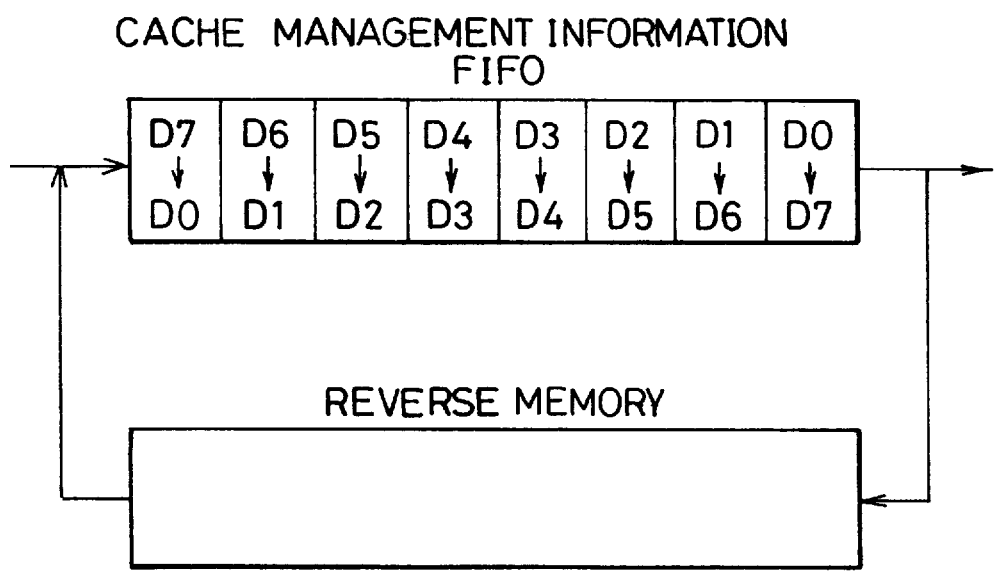
FIG. 22 shows an example of the memory apparatus using a reverse memory based on this invention.
Figure 23:
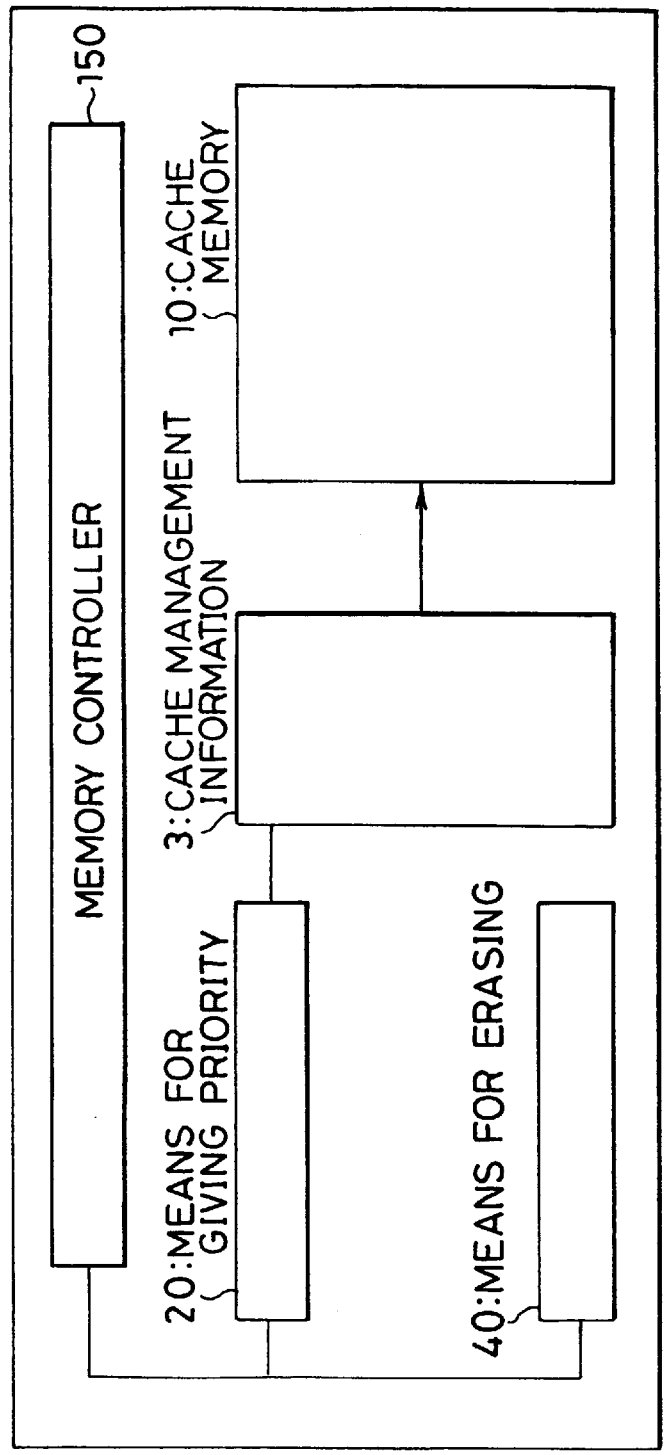
FIG. 23 shows a block diagram of a configuration of a conventional memory apparatus.
Figure 24:
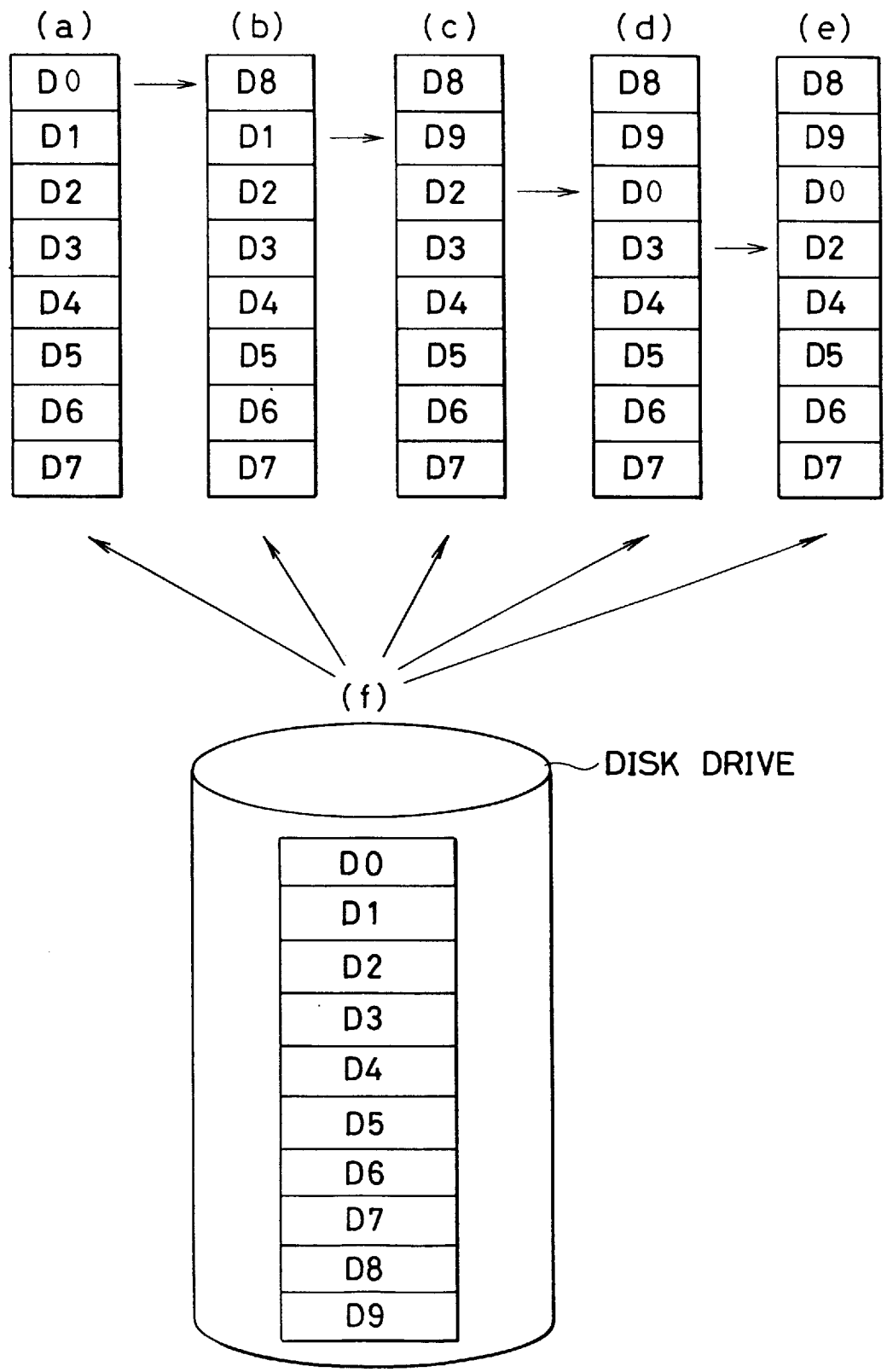
FIG. 24 shows the operation of a conventional disk cache memory.

FIG. 21 illustrates the cache management information on this invention. In FIG. 21, order of data stored in the cache memory is maintained in a stack A and the order is replaced to a stack B to be reversed. FIG. 22 shows how order of data in the cache management information in the memory apparatus of this invention is stored in the FIFO memory and the order is reversed by the use of a reverse memory.

Embodiment 6.

In the preceding embodiments, there were shown the cases of the disk cache memory. It is possible to apply the described memory apparatus and method based on this invention not only to the disk cache memory but to the cache memory for accessing the main memory in use of the processor. In a communicator system, it is possible to apply the described memory apparatus to the cache memory which stores transferred data temporarily.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A memory apparatus comprising:
   a memory for inputting and storing data;
   means for giving priority, subsequent to a first access of the memory, to data stored in the memory based on a priority determination, including means for giving a unique respective priority to each of the data so that all data in the memory apparatus is arranged in an order;
   means for erasing data having lower priority; and,
   means for changing priority, prior to a next memory access that is subsequent to the first memory access, given to each of the data at a timing point, including a reverse means for reversing priority so that the order of all data in the memory apparatus is reversed.

2. The memory apparatus of claim 1, wherein the means for giving priority uses a priority determination, which is based on a concept that data access is partial.

3. The memory apparatus of claim 1, wherein the means for giving priority uses Least Recently Used as a priority determination.

4. The memory apparatus of claim 1, wherein the means for giving priority has a forward pointer and a backward pointer for indicating the order of input data, and wherein the means for changing priority has a reverse means for reversing the forward pointer and the backward pointer.

5. The memory apparatus of claim 1, wherein the means for giving priority has First In First Out memory, and stores an order of input data using the First In First Out memory, and wherein the means for changing priority changes the order of input data stored in the First In First Out memory.

6. The memory apparatus of claim 1, wherein the means for giving priority has a stack memory for storing an order of input data using the stack memory, and wherein the means for changing priority changes the order of input data stored in the stack memory.

7. The memory apparatus of claim 1, wherein the memory is a disk cache memory.

8. The memory apparatus of claim 1, wherein the means for changing priority includes means for receiving an input from an operating system to determine the timing point.

9. The memory apparatus of claim 1, wherein the means for changing priority includes means for receiving an input from an application program to determine the timing point.

10. The memory apparatus of claim 1, wherein the means for changing priority includes means for receiving an input from an operator to determine the timing point.

11. The memory apparatus of claim 1, wherein the memory stores data which is stored temporarily in a communications system.

12. The memory apparatus of claim 1, wherein the means for changing priority includes a timing detector which detects the timing point.

13. The memory apparatus of claim 12, wherein the timing detector determines the timing point by analyzing a data retrieval command for retrieving data.

14. The memory apparatus of claim 12, wherein the timing detector determines the timing point by analyzing a data retrieval command written in Structured Query Language.

15. The memory apparatus of claim 12, wherein the timing detector determines the timing point, and wherein the means for changing priority has a reverse means for reversing priority.

16. The memory apparatus of claim 12, wherein the timing detector determines the timing point, and wherein the means for changing priority shifts the priority.

17. The memory apparatus of claim 12, wherein the timing detector includes means for detecting when a cache memory hit ratio falls below a threshold.

18. The memory apparatus of claim 12, wherein the timing detector includes means for detecting when a predetermined number of cache memory misses occurs.

19. The memory apparatus of claim 12, wherein the timing detector includes means for detecting that the next memory access is a second consecutive memory access of a particular block of data.

20. The memory apparatus of claim 19, wherein the means for changing priority has a means for shifting priority.

21. The memory apparatus of claim 19, wherein the means for changing priority has a forward pointer and a backward pointer for indicating the order of input data, and wherein the means for changing priority has a pointer shift means for shifting the forward pointer and the backward pointer.

22. The memory apparatus of claim 19, wherein the means for changing priority has a means for changing priority to a randomly selected priority.

23. A memory apparatus comprising:
   a memory for inputting and storing data;
   means for giving priority, subsequent to a first access of the memory, to data stored in the memory based on a priority determination;
   means for erasing data having lower priority; and,
   means for changing priority, prior to a next memory access that is subsequent to the first memory access, given to each of the data at a timing point, the means for changing priority including a timing detector which detects the timing point;

wherein the timing detector determines the timing point by detecting a start of an operation to access a block of data, which block of data including an amount of data that is greater than a storage capability of the memory.

24. A method for managing a memory apparatus, receiving input data in an order, and storing the input data given priority based on a priority determination in the memory apparatus, and erasing data having lower priority, the method comprising the steps of:

a) detecting a timing point to change priority of the input data stored in the memory apparatus;

b) recognizing a need of changing priority of data stored in the memory apparatus; and c) changing priority of data stored in the memory apparatus, when the step of detecting a timing point detects the timing point to change the priority, and the step of recognizing a need, recognizes the need of changing priority of data stored in the memory apparatus;

wherein the step of detecting a timing point has a step of analyzing a data retrieval command for retrieving data so as to detect the timing point to change priority, and wherein the step of analyzing has a step of judging the timing point when a data retrieval command is a reference command for all data in one table, such data indicated by the reference command including an amount of data that is greater than a storage capability of the memory apparatus.

25. The method for managing the memory apparatus of claim 24, wherein the step of recognizing a need includes receiving an input from an operating system.

26. The method for managing the memory apparatus of claim 24, wherein the step of recognizing a need includes receiving an input from an application program.

27. The method for managing the memory apparatus of claim 24, wherein the step of recognizing a need includes receiving an input from an operator.

28. The method for managing the memory apparatus of claim 24 wherein the step of analyzing includes detecting that the next memory access is a second consecutive memory access of a particular block of data.

29. The method for managing the memory apparatus of claim 24, wherein the step for recognizing a need has a step of storing a plurality of access results of data stored in the memory apparatus, and a step of judging needs for changing priority based on stored access results.

30. The method for managing the memory apparatus of claim 29, wherein the step of judging needs has a step of calculating a hit ratio from access results, wherein a need is recognized when the hit ratio is below a threshold value.

31. The method for managing the memory apparatus of claim 29, wherein the step of judging needs has a step of counting the consecutive number of non-hit access times based on access results, wherein a need is recognized when a number of consecutive non-hit access times is below a fixed threshold value.

32. The method for managing the memory apparatus of claim 24, further comprising a step of giving priority by chaining data with a pointer, wherein the step of changing priority has a step of changing chains of the pointer.

33. The method for managing the memory apparatus of claim 32, wherein the step of changing chains has a step of reversing a head and a tail of a chain, to reverse an entire order of priority of data in the chain.

34. The method for managing the memory apparatus of claim 32 wherein the step for changing chains has a step of shifting a head of a chain.

35. The method for managing the memory apparatus of claim 32, wherein the step of changing chains has a step of randomly setting an order of priority of a chain.

36. A memory apparatus comprising:

a memory for inputting and storing data;

means for giving priority, subsequent to a first access of the memory, to data stored in the memory based on a priority determination;

means for erasing data having lower priority;

means for detecting a timing point to change priority of data stored in the memory;

means for recognizing a need of changing priority of data stored in the memory; and, means for changing priority, prior to a next memory access that is subsequent to the first memory access, given to each of the data when the means for detecting a timing point detects the timing point to change the priority, and the manes for recognizing a need recognizes the need of changing priority of data stored in the memory apparatus, wherein the means for detecting a timing point determines the timing point by detecting a start of an operation to access a block of data, which block of data including an amount of data that is greater than a storage capability of the memory.

* * * * *